US011804098B2

(12) United States Patent
Takine et al.

(10) Patent No.: US 11,804,098 B2
(45) Date of Patent: Oct. 31, 2023

(54) GAME TABLE READING SYSTEM

(71) Applicant: ANGEL GROUP CO., LTD., Shiga (JP)

(72) Inventors: Naoya Takine, Shiga (JP); Satoru Monji, Shiga (JP)

(73) Assignee: ANGEL GROUP CO., LTD., Shiga (JP)

(*) Notice: Subject to any disclaimer, the term of this patent is extended or adjusted under 35 U.S.C. 154(b) by 0 days.

(21) Appl. No.: 17/732,112

(22) Filed: Apr. 28, 2022

(65) Prior Publication Data
US 2022/0254218 A1 Aug. 11, 2022

Related U.S. Application Data

(63) Continuation of application No. 17/019,718, filed on Sep. 14, 2020, now Pat. No. 11,348,403.

(30) Foreign Application Priority Data

Sep. 19, 2019 (JP) ................................. 2019-170398

(51) Int. Cl.
G07F 17/32 (2006.01)
A63F 1/18 (2006.01)
A63F 1/00 (2006.01)

(52) U.S. Cl.
CPC ............. G07F 17/322 (2013.01); A63F 1/18 (2013.01); G07F 17/3241 (2013.01); G07F 17/3251 (2013.01); A63F 2001/001 (2013.01)

(58) Field of Classification Search
None
See application file for complete search history.

(56) References Cited

U.S. PATENT DOCUMENTS

| 8,528,909 | B2 | 9/2013 | Gelinotte et al. |
| 9,919,201 | B2 | 3/2018 | Walker |
| 2005/0212673 | A1 | 9/2005 | Forster |
| 2007/0194931 | A1 | 8/2007 | Miller et al. |
| 2008/0067745 | A1 | 3/2008 | Wikstrom |
| 2008/0113772 | A1 | 5/2008 | Burrill et al. |
| 2008/0113783 | A1 | 5/2008 | Czyzenwski et al. |

(Continued)

OTHER PUBLICATIONS

European Search Report dated Feb. 11, 2021 issued in EP application 20196823.7.

Primary Examiner — Ronald Laneau
(74) Attorney, Agent, or Firm — NORTON ROSE FULBRIGHT US LLP

(57) ABSTRACT

The game table reading system comprises reading antennas for each of a plurality of reading areas of a game table, read-restriction antennas for each of the plurality of the reading areas, the read-restriction antennas restricting the RFID tag embedded in a game token placed in the corresponding reading area from being read by the reading antenna corresponding to the other adjacent reading areas, a reading control device that controls the reading antennas, and a read-restriction control device that controls the read-restriction antennas. The read-restriction control device causes the read-restriction antennas corresponding to the reading areas adjacent to the reading areas corresponding to the reading antenna that the reading control device causes to read, in synchronization with the reading control device.

20 Claims, 30 Drawing Sheets

(56) References Cited

U.S. PATENT DOCUMENTS

| | | |
|---|---|---|
| 2009/0093293 A1 | 4/2009 | Koyama et al. |
| 2010/0176924 A1 | 7/2010 | Seitz |
| 2013/0168449 A1 | 7/2013 | Lee |
| 2013/0296041 A1* | 11/2013 | Emori .................. G07F 17/322 |
| | | 463/29 |
| 2021/0134114 A1* | 5/2021 | Wingate ............. G07F 17/3211 |
| 2022/0139148 A1* | 5/2022 | Shigeta ............... G07F 17/3237 |
| | | 235/451 |

* cited by examiner (a)

GAME TABLE READING SYSTEM

CROSS REFERENCE TO RELATED APPLICATION

This application is a continuation of U.S. patent application Ser. No. 17/019,718 filed Sep. 14, 2020, which claims priority to JP Pat. App. Application No. 2019-170398 filed Sep. 19, 2019, the entire contents of each disclosure are hereby incorporated by reference.

TECHNICAL FIELD

This disclosure relates to a game table reading system for reading RFID tags at a game table used for table games.

BACKGROUND

In casinos, a game table is used. On the game table, betting targets are defined by lines or colors, and a player places a bet on the betting target by placing game tokens for a bet on the betting target defined on the game table. For example, in a baccarat table, a plurality of play positions are provided, and in each play position, betting targets, such as a player, a banker, or a tie, is defined by lines or color coding.

On the other hand, recently, RFID tags embedded into the game token that store information such as the identification information of the game token (chip ID) have been introduced for the following purposes: to prevent players and dealers from cheating or making mistakes; to keep track of bets, redemption amounts, and collection amounts for use in casino management; and to trace the movement of the game tokens in casinos. And a plurality of antennas for reading the RFID tag are provided on the game table or the like. The management and control unit acquires information on the RFID tags read from the plurality of antennas and determines where the game token is located by which RFID tag is detected by which antenna.

In order to understand the movement of the game token, it is useful to determine the position of the game token in the game table in a more detailed manner. For example, it is effective in order to achieve the above-described objective in a higher degree to understand not only that the game token is in a certain game table, but also in which playing position and on which betting target the game token is placed for betting.

SUMMARY

It is useful to use a number of reading antennas with a narrower reading range in order to obtain a more detailed position of the game token on the game table. However, if such reading antennas are in close proximity to each other, the problem arises that the RFID tags in the game token may be read beyond the reading range intended for each of the reading antennas, and even reads the RFID tags of the game token in a reading range of the other reading antennas.

Therefore, it is an object of the present disclosure to provide a game table reading system that reduces the problem of a plurality of reading antennas of a game table reading RFID tags in a reading range of other reading antennas.

The game table reading system of one aspect is a game table reading system for game tokens, comprising: a game table having a plurality of reading areas including at least a plurality of betting areas for positioning a game token in which an RFID tag is embedded; a plurality of reading antennas installed in correspondence with each of the plurality of reading areas for reading the RFID tag embedded in the game token placed in the corresponding reading areas; a read-restriction antenna installed in correspondence with each of the plurality of reading areas for restricting reading of an RFID tag embedded in the game token placed in the corresponding reading area by the reading antenna corresponding to other adjacent reading areas; a reading control device connected to the plurality of reading antennas to control the plurality of reading antennas; and a read-restriction control device connected to the plurality of read-restriction antennas to control the plurality of read-restriction antennas, wherein the reading control device causes the plurality of reading antennas to read in sequence, and the read-restriction control device causes the plurality of read-restriction antennas corresponding to the plurality of reading areas which are adjacent to the reading area corresponding to the reading antenna which is caused to read by the reading control device to restrict reading, in synchronization with the reading control device.

With this configuration, the reading is restricted in a plurality of reading areas adjacent to the reading area where the reading antenna performs the reading, and the reading area where the reading antenna performs the reading is switched in order, so that even when the plurality of reading areas are adjacent to each other and the reading areas are relatively close to each other, the RFID tags can be properly read in each reading area.

In the above game table reading system, the reading control device may control the plurality of reading antennas so that the plurality of reading antennas corresponding to a plurality of adjacent reading areas do not read simultaneously.

With this configuration, because it is controlled so that adjacent reading areas are not read at the same time, the plurality of reading areas can be read more reliably.

In the above game table reading system, the read-restriction control device may cause the read-restriction antenna within a predetermined distance from the reading antenna performing the reading to perform read-restriction.

With this configuration, the reading of reading areas that are not adjacent to the reading area where the reading is being performed but could be read by the reading antenna can be restricted.

In the above game table reading system, the reading control device may start reading the next reading antenna when a predetermined time has elapsed since no new information is read from the previous reading antenna to read.

With this configuration, reading can be performed in a high time efficiency while preventing leftover readings, even when a large number of RFID tags are present in the reading area and reading takes a long time, or when there are only a small number of RFID tags in the reading area, or when there are no RFID tags in the reading area and reading is completed in a short time.

In the game table reading system described above, the reading control device may have a reading intensity setting unit that sets the intensity of the electromagnetic waves for reading by the reading antenna, and the read-restriction control device may determine the read-restriction antenna to perform read-restriction according to the intensity set by the reading intensity setting unit.

With this configuration, the read-restriction can be limited to the extent necessary depending on the intensity of the electromagnetic waves of the reading antenna.

In the game table reading system described above, the read-restriction control device may determine a read-restriction antenna that performs read-restriction depending on a size of the area to be read by the reading control device.

With this configuration, different read-restriction antennas for read-restriction may be used according to cases in which a large area is read, such as when simultaneous reading is performed by a plurality of reading antennas or in which the reading is performed only in a relatively narrow area.

In the game table reading system described above, the reading control device may cause a plurality of the plurality of reading antennas to read simultaneously, and the read-restriction control device may cause the read-restriction antenna between the plurality of reading antennas that are simultaneously reading to perform read-restriction.

With this configuration, a plurality of reading areas can be read simultaneously by a plurality of reading antennas while avoiding the reading of RFID tags in reading areas other than the corresponding reading areas by the reading antenna.

In the game table reading system described above, the reading control device can cause another plurality of the plurality of the reading antennas to read simultaneously after all of the plurality of the reading antennas have completed reading.

With this configuration, simultaneous reading of adjacent reading areas is prevented.

The above-described game table reading system may further comprise a game status determination system to determine the progress of the game, and the reading control device may cause the reading antenna selected according to the progress determined by the game status determination system to perform the reading.

With this configuration, the reading can be performed for necessary reading area according to the progress of the game.

In the game table reading system described above, the game table may be a table for baccarat game, and the plurality of reading areas may include a plurality of side betting areas provided for each play position and located adjacent to each other.

With this configuration, the read-restriction antenna can be prevented from interfering with the reading by the reading antenna corresponding to the same reading area.

In the above game table reading system, the reading antenna may be looped, and the reading control device may open a loop of the reading antenna in the reading area where no reading is performed.

In the game table reading system described above, the game table may be a table for baccarat game, and the plurality of reading areas may include a plurality of side betting areas provided for each play position and located adjacent to each other.

With this configuration, information from an RFID tag embedded in a game token bet in a side betting area in a baccarat game can be read.

In the game table reading system described above, the game table may have a plurality of play positions, and the plurality of reading areas may be provided for each of the play positions.

With this configuration, the RFID tags can be read separately for each play position.

In the game table reading system described above, the plurality of reading areas may include a player area and a banker area adjacent to each other for each play position.

With this configuration, the RFID tags can be read by each play position and by each betting object.

In the game table reading system described above, the player area and the banker area may be divided into a plurality of the reading areas.

With this configuration, each stack of game tokens can be read, even when different users bet on the same betting area.

In the game table reading system described above, the RFID tag may be embedded in a member's card given to a user playing at the game table, and the plurality of reading areas may include a card reading area wherein the member's cards are placed.

With this configuration, the member's cards can be read on the game table.

In the game table reading system described above, the plurality of reading areas may include a chip tray area for the dealer to store the game token, and when the reading control device causes the reading antenna corresponding to the chip tray area to perform reading, the read-restriction control device may cause the read-restriction antenna corresponding to the reading area other than the chip tray area to perform read-restriction.

With this configuration, the RFID tag in the betting area can be prevented from being read thereby, even if the reading antenna corresponding to the chip tray area uses a relatively strong electromagnetic wave.

In the game table reading system described above, the plurality of reading areas may include a pay area for reading the game token to be paid out from the dealer to a winning player, and the read-restriction control device may cause the read-restriction antenna corresponding to the other read areas around the pay area to restrict reading when the reading antenna corresponding to the pay area is reading.

With this configuration, the reading of RFID tags in other reading areas around the pay area can be prevented from being read.

In the game table reading system described above, the plurality of betting areas may include a player area and a banker area for each of the play positions, and the read-restriction control device may control the plurality of read-restriction antennas so that when the reading antenna corresponding to a player area of a play position performs the reading, the read-restriction antenna corresponding to a banker area of the play position performs the read-restriction, and when the reading antenna corresponding to a banker area of a play position performs the reading, the read-restriction antenna corresponding to a player area of the play position performs the read-restriction.

With this configuration, the play area and the banker area of the same play position can be read separately from each other.

In the game table reading system described above, the plurality of reading areas adjacent to each other may be separated by one or two lines and are adjacent to each other by a distance smaller than the size of the game token.

The game table reading system described above may further comprise: a camera that takes a picture of the game token placed in the reading area and generates an image; and an image recognition device, which, by analyzing the image generated by the camera, identifies a reading area where the game token is placed, the type and number of the game token.

DESCRIPTION OF EMBODIMENTS

In the following, a game table reading system for reading RFID tags in a game table will be described. In the following embodiments, a case in which the game table is a baccarat table for playing a baccarat game will be used as an example, however, the present disclosure is not limited to a baccarat table, but can be applied to any game table.

Figure 1:
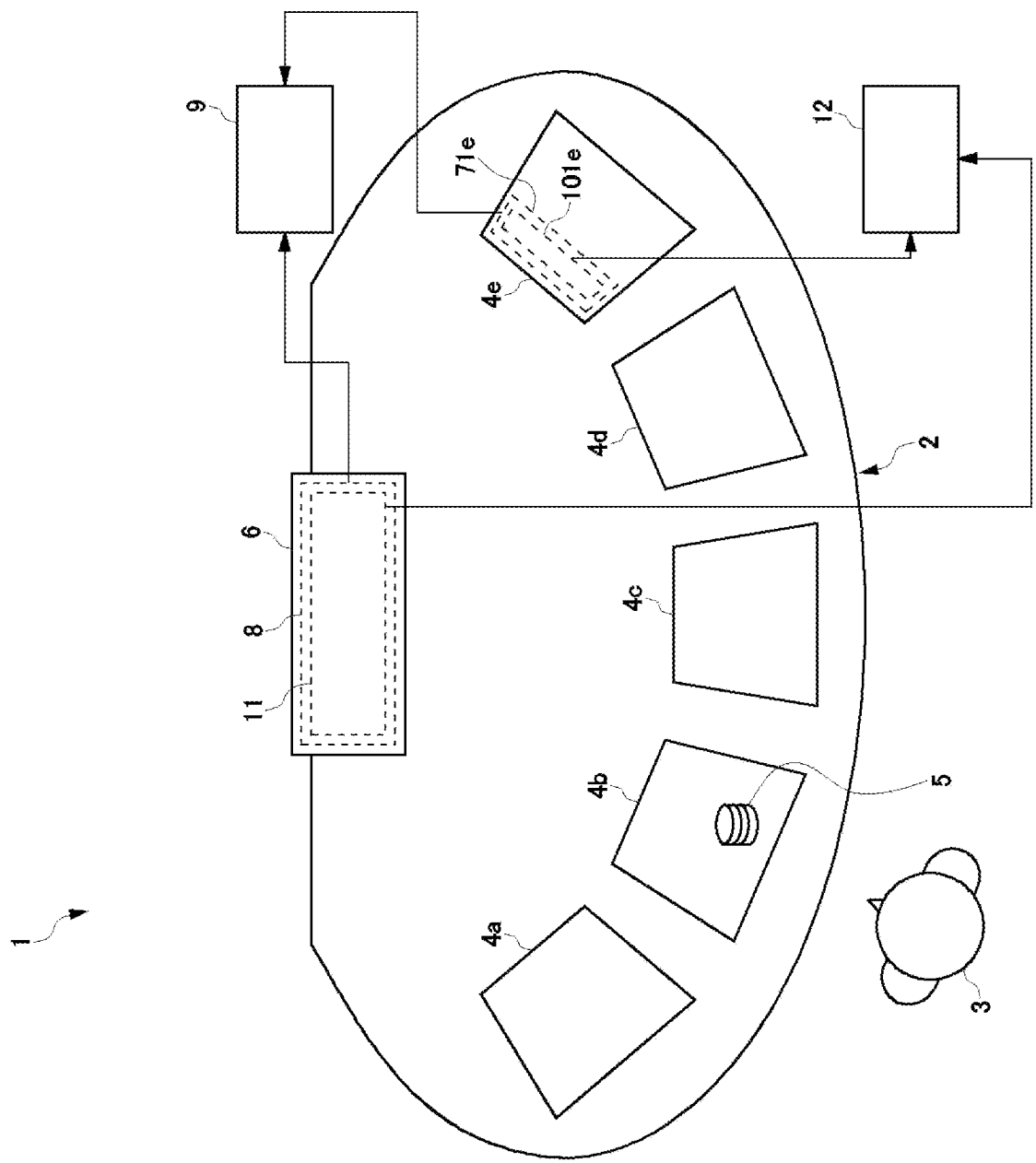
FIG. 1 illustrates a configuration of a game table reading system of a first embodiment of the present invention.

FIG. 1 illustrates the configuration of a game table reading system of a first embodiment of the present invention. The game table reading system 1 is provided with a game table 2 of an approximate oval shape. A player 3 is located on one side of the game table 2 (the lower side of FIG. 1) and a dealer (not shown) is located on the opposite side of the game table 2. On an upper surface of the game table 2, betting areas 4a to 4e (hereinafter collectively referred to as "betting area 4") are compartmentalized for each plurality of playing positions. Betting Area 4 is an area for a player 3 to place a bet by placing his/her game token (or gaming chip) 5. A chip tray 6 is provided on the dealer position side of the game table 2 for placing the dealer's game tokens 5. Although the figure is omitted for ease of viewing, each betting area 4a to 4e is divided into a player pair area, a banker pair area, a tie area, a player area and a banker area.

Figure 2:
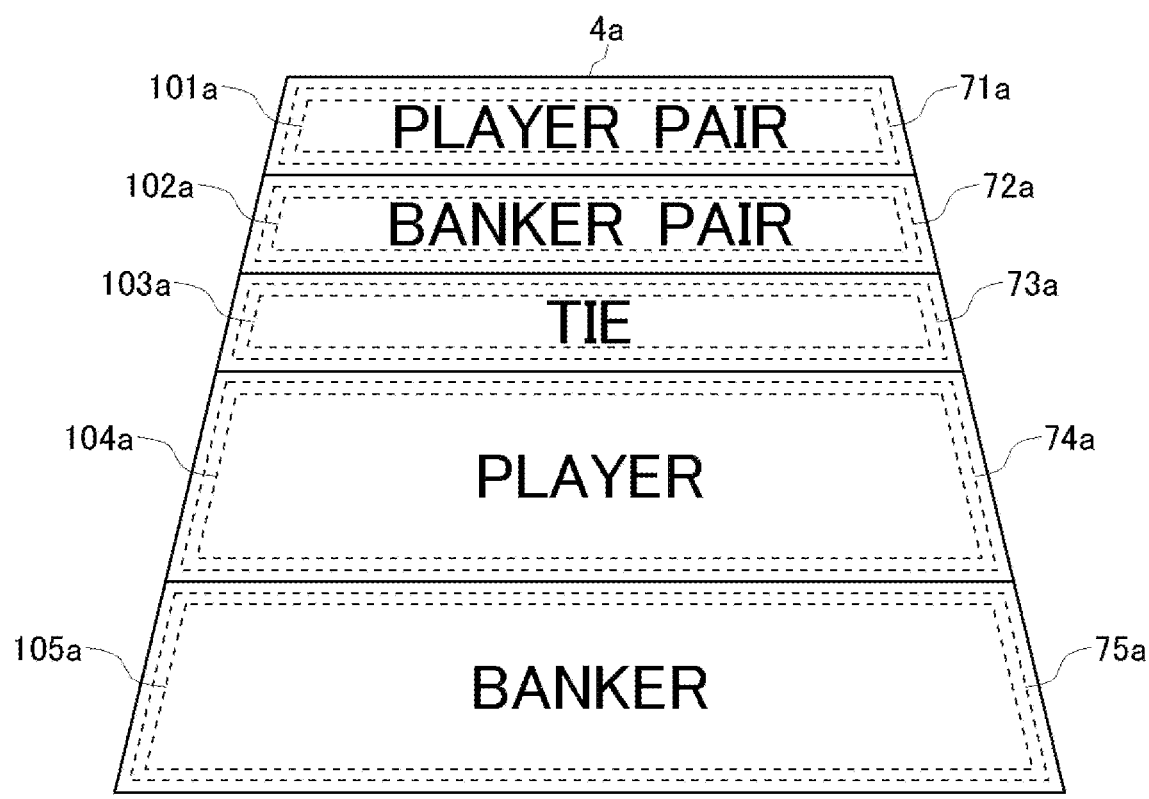
FIG. 2 illustrates a betting area of a first embodiment of the present invention.

As described above, each betting area 4a to 4e of the game table 2 is divided into a player pair area, a banker pair area, a tie area, a player area and a banker area. Betting area 4a is illustrated in FIG. 2. In addition, each area of each betting area is provided with reading antennas 71a to 75e (hereinafter collectively referred to as "reading antennas 7") for reading the RFID tags built into the game tokens 5. (hereinafter collectively referred to as "reading antennas 7") are provided for reading the RFID tags built into the game tokens 5. Specifically, the reading antennas 7 are embedded under thick woolen carpets on a top surface of the game table 2, respectively, at a position where the corresponding betting area 4 is demarcated. A reading antenna 8 is also provided in the chip tray 6.

In the following, each area in which the reading antenna is installed may be referred to as the reading area. That is, the player pair area, the banker pair area, the tie area, the player area, the banker area, and the chip tray 6 each fall under the reading area.

The reading antenna 7 and the reading antenna 8 are connected to the reading control device 9. In FIG. 1, only a dashed line indicating the reading antenna 71e and a line connecting it to the reading control device 9 is shown, and the dashed lines indicating reading antennas other than 71e and connecting them to the reading control device 9 are not shown in the figure for ease of viewing. It is provided in the betting area 4 and is further connected to the reading control device 9 as well as the reading antenna 71e. The same is true in the following drawings. The reading control device 9 distinguishes each reading antenna from the other and controls the reading.

In each betting area 4a to 4e of game table 2, in addition to the reading antennas 71a to 75e, there is a read-restriction antenna 101a to 105e (hereinafter collectively referred to as "read-restriction antenna 10"). The read-restriction antenna 10 has a function of restricting the reading of RFID tags embedded in the game tokens 5 placed in the reading area to which each antenna corresponds by the reading antenna 7 corresponding to the other adjacent reading area. Like the reading antenna 7, the read-restriction antenna 10 is embedded under the thick woolen carpets on the top surface of the game table 2 and at the location where the corresponding betting area 4 is demarcated. The chip tray 6 is also provided with a read-restriction antenna 11.

The read-restriction antennas 101a to 105e and the read-restriction antenna 11 are connected to the read restriction control device 12. The read-restriction control device 12 distinguishes each read-restriction antenna from the other and controls the read-restriction.

The reading control device 9 causes the reading antenna 7 to read in sequence, and the read-restriction control device 12 causes the read-restriction antenna 10, which is synchronized with the reading control device 9, to restrict the reading by the reading antenna 10 corresponding to a reading area adjacent to the reading area that corresponds to the reading antenna 7 that the reading control device 9 causes to read.

The specific reading process will be described using FIG. 2. For example, when reading in the tie area, the reading antenna 73a performs the reading, and the read-restriction antenna 102a for the banker pair area which is adjacent to the tie area and the read-restriction antenna 104a for the player area which is adjacent to the tie area are made to perform the read-restriction. Thus, each area is read in turn.

The betting area 4 includes a player area and a banker area, but they are not read at the same time. In FIG. 2, when the reading antenna 74a for the player area reads, the read-restriction control device 12 causes the read-restriction antenna 105a of the banker area to restrict the reading. Similarly, when the reading antenna 75a for the banker area performs the reading, the read-restriction control device 12 causes the read-restriction antenna 104a for the player area to perform the reading restriction. In the example in FIG. 1, the reading control device 9 and the read-restriction device 12 are separate devices, but they may be comprised of a single device. These devices may be devices that control an antenna board called an RFID reader.

This configuration allows for accurate reading of the player area and the banker area existing in the same play position.

By the above configuration, the reading is restricted in a plurality of reading areas adjacent to the reading areas where the reading antenna 7 reads, and the reading areas where the reading antenna 7 reads are changed (switched) in order, so that even when the plurality of reading areas are adjacent to each other and the reading areas are crowded, the RFID tags can be properly and separately read for each reading area.

The read-restriction control device 12 may cause the read-restriction antenna 10 within a predetermined distance from the reading antenna 7 that is being read to perform the reading restriction, even if the reading area of the read-restriction antenna 10 is not adjacent to the reading area being read.

That is, for example, in FIG. 2, when the reading of the banker area is performed with the reading antenna 75a, the read-restriction control device 12 may cause not only the read-restriction antenna 104a in the player area adjacent to the banker area, but also the read-restriction antenna 103a in the tie area to perform the read-restriction.

This configuration makes it possible to restrict reading in a reading area that may be read by the reading antenna 7 that is reading, even if it is not adjacent to the reading area where the reading is being performed.

The read restriction control device 12 controls the read-restriction by the plurality of read-restriction antennas 10 so that the reading antenna 7 and the read-restriction antenna 10 corresponding to the same reading area do not read and restrict reading at the same time.

In the illustration, the reading antenna 7 for the reading area is shown on the outside and the read-restriction antenna 10 for the reading area, but it does not necessarily have to be in this arrangement, and the arrangement of each antenna can be of any configuration. The same applies to the following.

Figure 3:
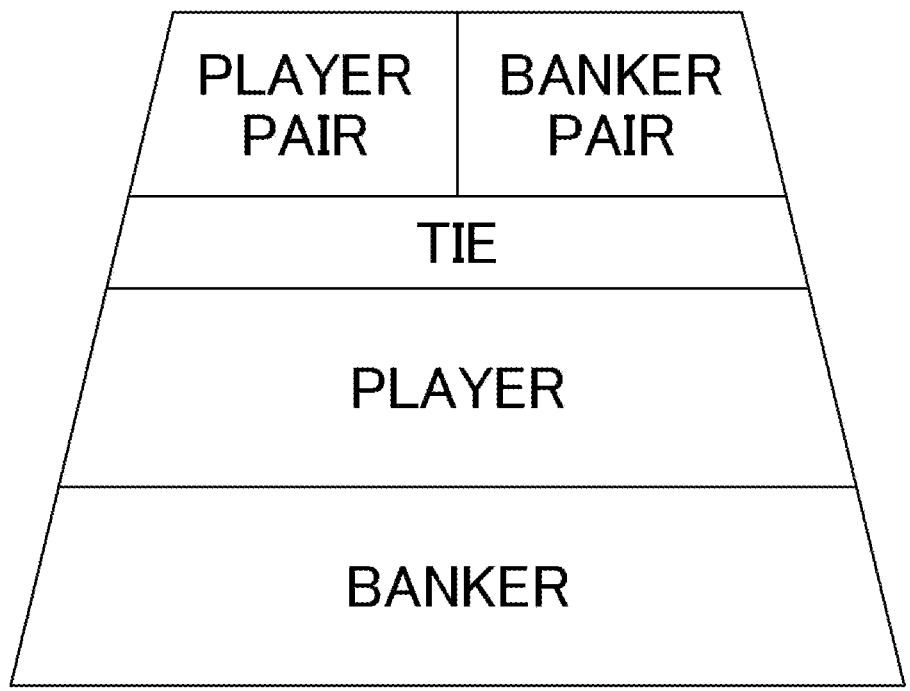
FIG. 3 illustrates another example of a betting area of the first embodiment of the present invention.

Furthermore, separation of areas within the betting area may be configured with a player-pair area and a banker-pair area side by side, as shown in FIG. 3.

The reading of the betting area does not necessarily have to be performed for each player-pair area, banker-pair area, tie area, player area, or banker area, but may be configured to read the entire betting area.

In addition, a side betting area is provided for each play position, which is an area in which the player plays the game. In FIG. 2, the player pair area and the banker pair area correspond to the side betting area. The reading may be configured for each side betting area.

The above configuration makes it possible to read the RFID tags for each play position and for each side betting area.

In baccarat, as described above, a plurality of play positions are provided on the game table 2, and a betting area 4 is provided for each play position on the game table 2 in the position corresponding to each play position. As a general rule, one play position is played by one player in one play position. However, if all the play positions are filled, a player (back betting player) appears from behind the player playing in the play position (sitting player) and bets on the betting area 4 allocated to said sitting player, and such betting may be allowed depending on the casino or the game table 2. A back bet will result in multiple game tokens 5 with different user IDs being bet on the same betting area. The game table reading system in this example allows for the reading of the game tokens 5 in such cases as well. Such a case will be explained the following by referring to FIG. 4.

Figure 4:
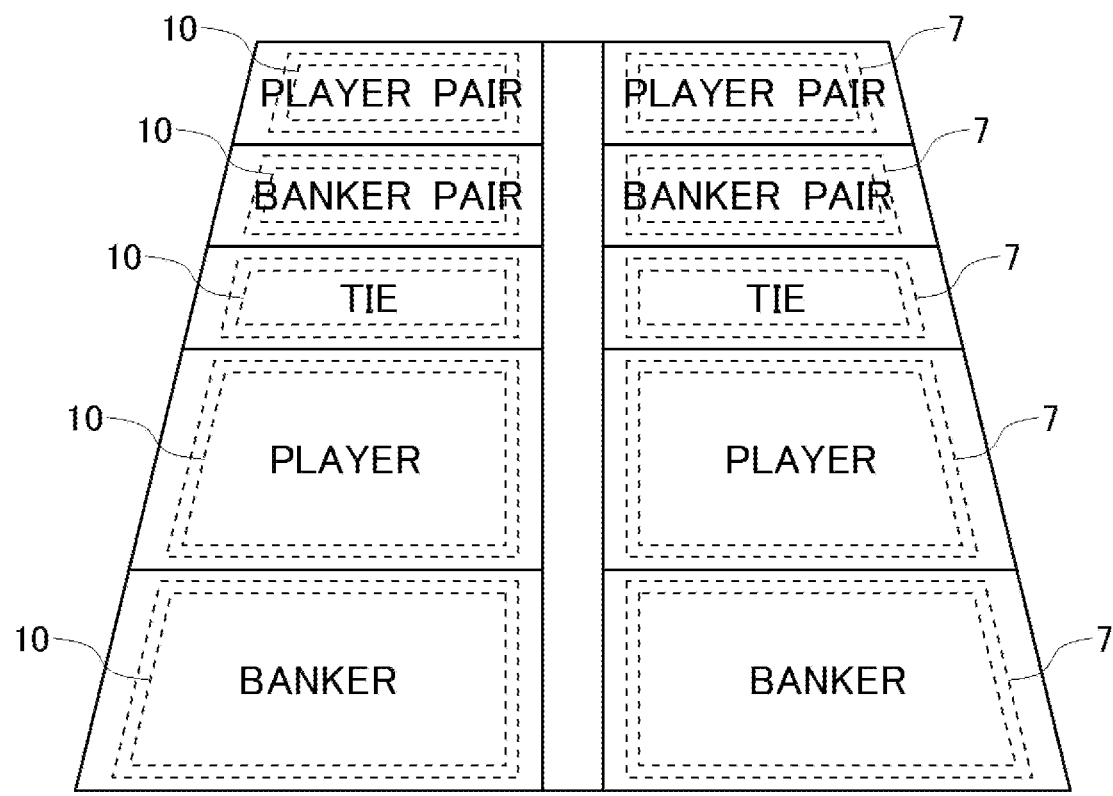
FIG. 4 illustrates a variant of the betting area of the first embodiment of the present invention.

FIG. 4 illustrates a variation of the betting area in the first embodiment. In this example, in addition to the configuration of the betting area shown in FIG. 2, each area is further divided into multiple areas. A reading antenna 7 and a read-restriction antenna 10 are also divided into each area.

The above configuration makes it possible to read each betting target within a play position and even when different users (e.g., a sitting player and a back betting player) bet on the same betting area, each stack of game tokens 5 can be read separately.

In FIG. 4, the betting area for each play position is divided into two areas, but the betting area may be divided into three or more areas. The game table 2 has one banker area, one player area, one tie area, one banker pair area, and one player pair area for each play position as shown in FIG. 2, and a plurality of the reading antenna 7 and a plurality of the read-restriction antenna 10 may be located in the same reading area as shown in FIG. 4.

Figure 5:
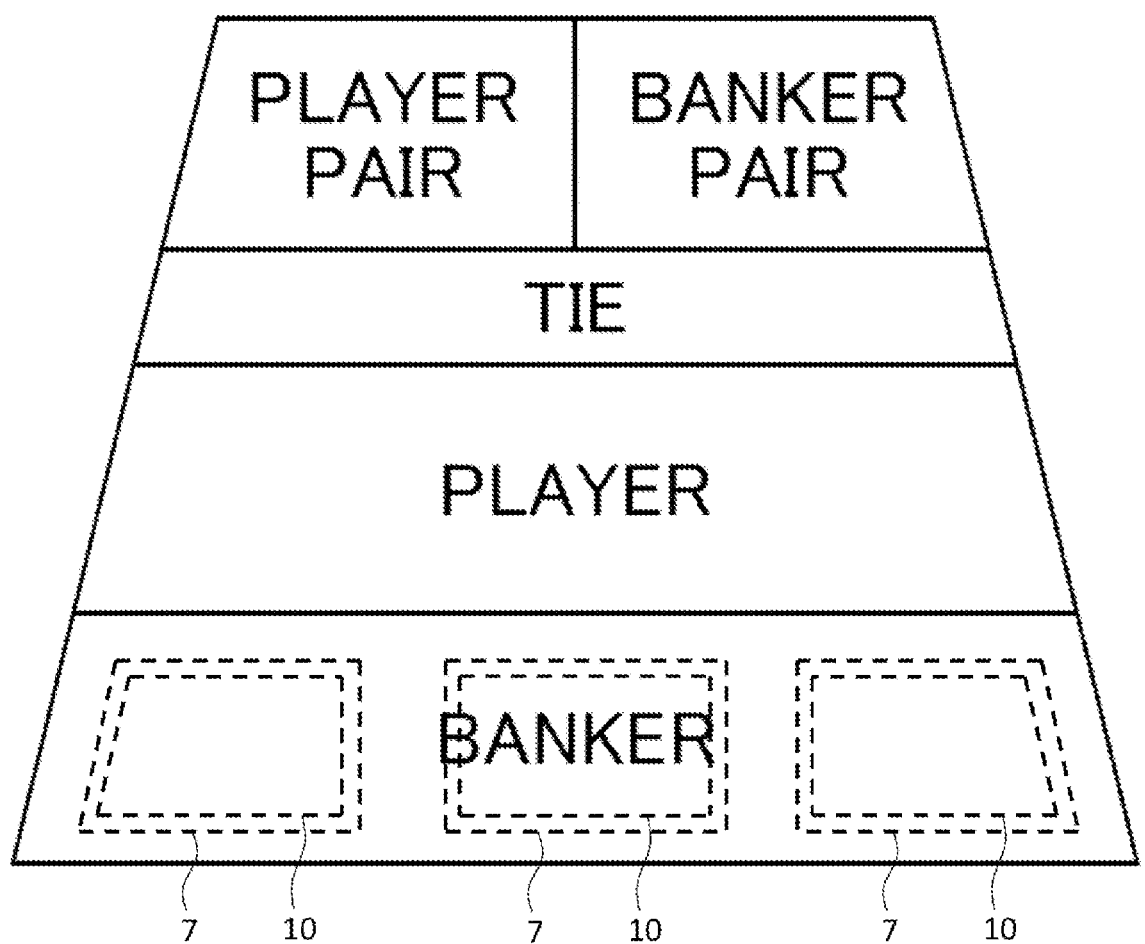
FIG. 5 illustrates another example of a betting area of the first embodiment of the present invention.

FIG. 5 illustrates another example of a betting area in the first embodiment. In this example, a plurality of reading antennas 7 are provided in a betting target area (in the example of FIG. 5, the banker area is illustrated). A plurality of reading antennas 7 are provided in the betting area (shown for the banker area in the example of FIG. 5), and a plurality of read-restriction antennas 10 are also provided for each of the reading antennas 7. This allows the game tokens 5 to be read separately within the same betting target area. This allows, for example, when there are multiple stacks of game tokens 83 in the same betting target, such as when a back bet is made, those stacks can be read by separate reading antennas 7, so that a plurality of stacks of game tokens 83 in the same betting target area can be read separately. For each stack, by recognizing and identifying the player who bet on it, it is possible to manage the main player (sitting player) and the back betting player by linking the user IDs to the information on the bet game tokens or payout game tokens.

Figure 6:
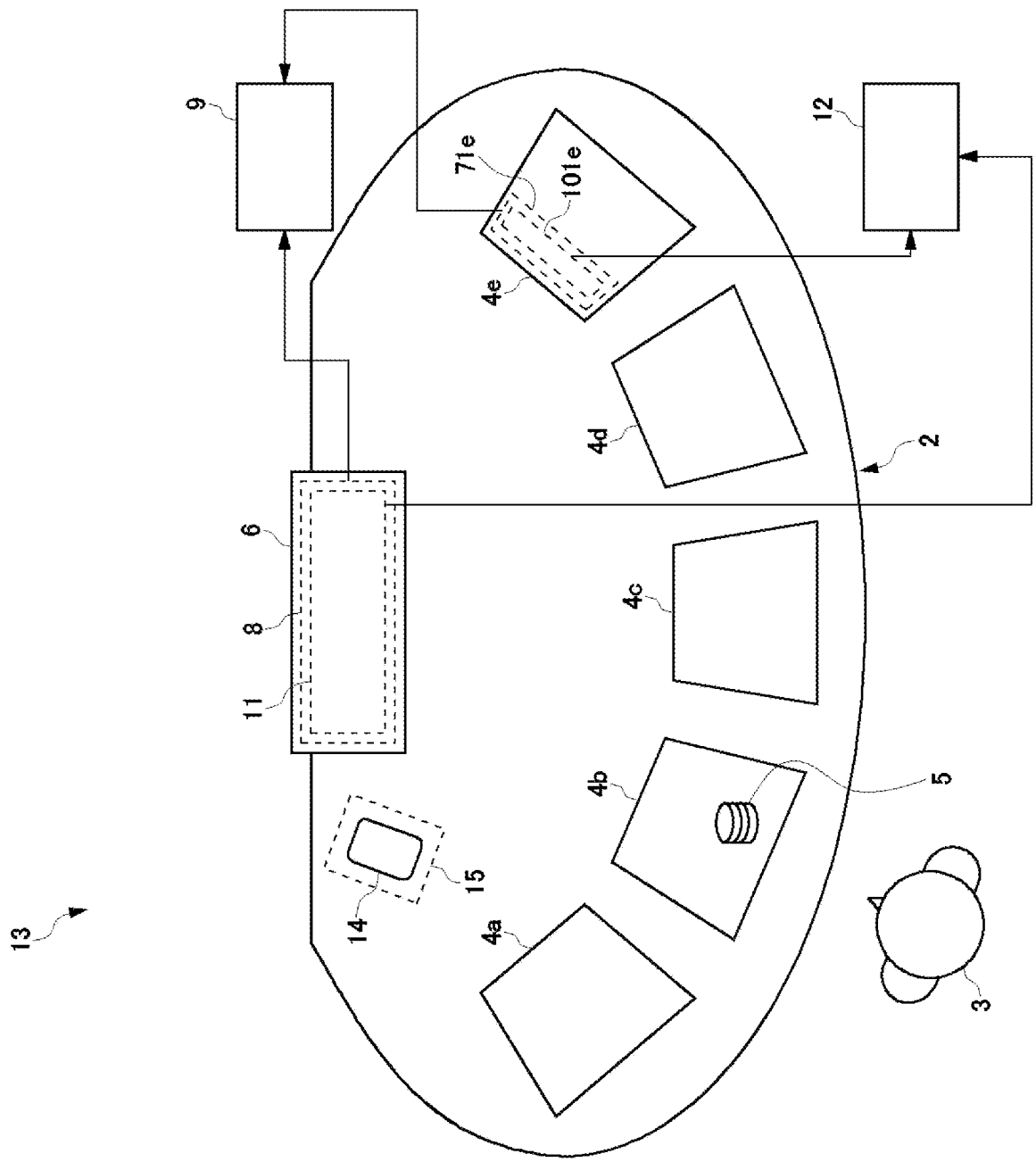
FIG. 6 illustrates a configuration of a game table reading system of a second embodiment of the present invention.

FIG. 6 illustrates the configuration of the game table reading system used in the second embodiment. In addition to the configuration of the game table reading system 1 of the first embodiment, a player identification system is introduced in the game table reading system 13. The player identification system includes a card authentication system comprising a member's card 14 and a card reading area 15. The member's card 14 is given to a user (a member) playing at the game table 2. An RFID tag is embedded in the member's card 14, and information on the member's card 14 is read by placing the member's card 14 in the card reading area 15. An identification information (user ID) is stored in the RFID tag of the member's card 14 to uniquely identify the player.

This configuration allows the member's card 14 to be read on the game table 2.

In FIG. 6, the card reading area 15 is located at one location of the game table 2, but it may be configured to be provided at multiple locations of the game table 2.

Further, the configuration may be such that a card reading area 15 is provided for each play position on the game table 2. Also, the betting area 4 for each play position may serve as a card reading area 15 for each play position. In this case, the reading antenna 7 provided in correspondence with the betting area 4 reads the RFID tag of the member's card 14.

With this configuration, the member information stored on the member's card 14 is read at the playing position, so the member does not have to hand the member's card 14 to the dealer, the dealer does not have to perform any operations on the member's card 14, and the game table reading system 13 can determine which members have took which play position.

The reading area referred to below includes the card reading area 15.

Figure 7:
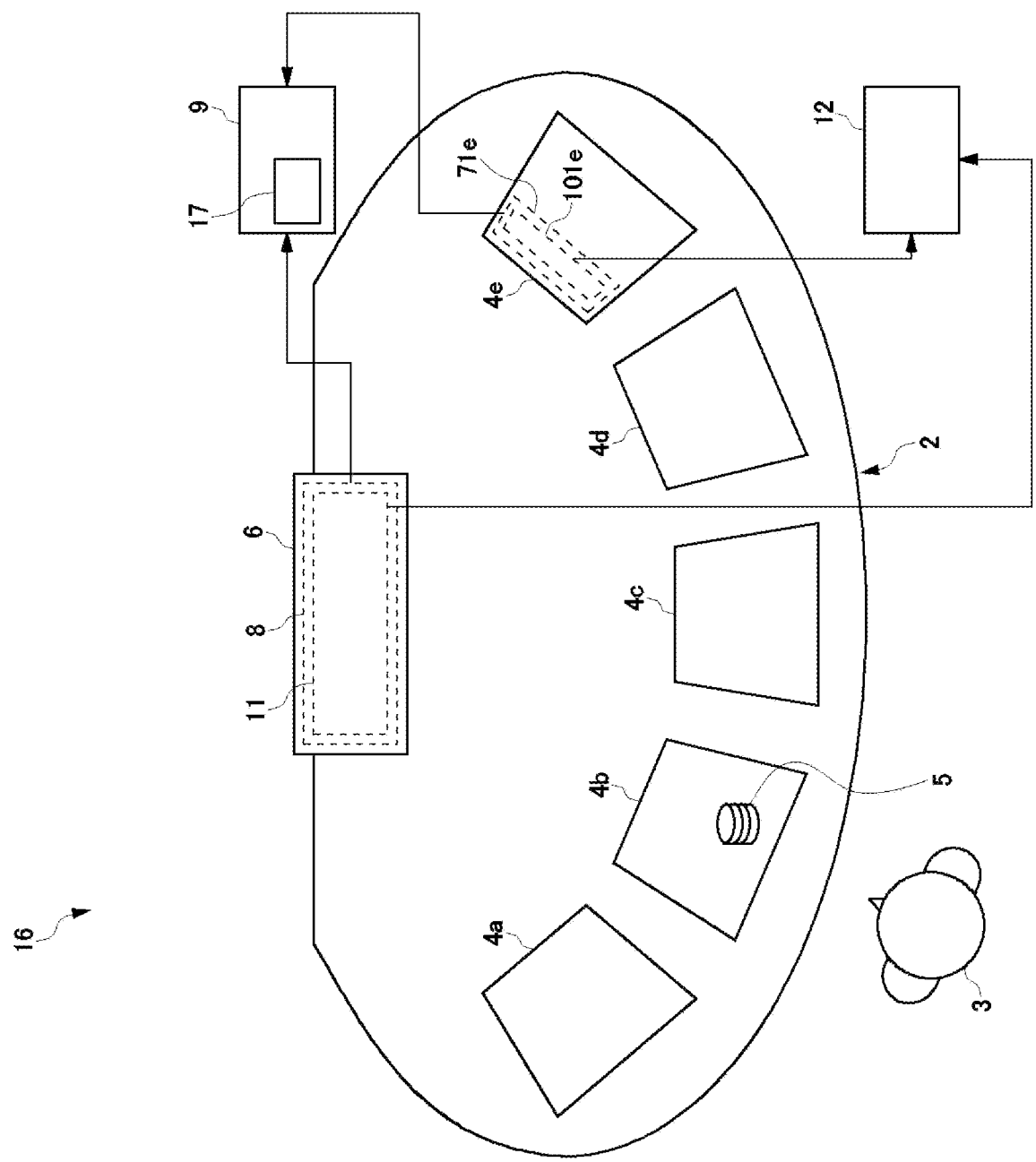
FIG. 7 illustrates a configuration of the game table reading system of a third embodiment of the present invention.

FIG. 7 illustrates the configuration of the game table reading system in the third embodiment. In addition to the configuration of the game table reading system 1 in the first embodiment, the game table reading system 16 has a reading intensity setting unit 17 in the reading control device 9. In general, electromagnetic waves are used to read the RFID tags. The reading intensity setting unit 17 sets the intensity of the electromagnetic waves for reading by the reading antenna 7. In addition, the read-restriction control device 12 determines the read-restriction antenna 10 to restrict the reading according to the intensity set by the read intensity setting unit 17.

This configuration makes it possible to restrict the reading within the required range according to the strength of the electromagnetic waves of the reading antenna 7. When the intensity of the electromagnetic waves of the reading antenna 7 is high, the range of the reading area in which the restriction of reading is made to be performed is widened, and conversely, when the intensity of the electromagnetic waves of the reading antenna 7 is low, the range of the reading area in which the restriction of reading is made to be performed is narrowed, so that a more accurate reading is made possible.

Figure 8:
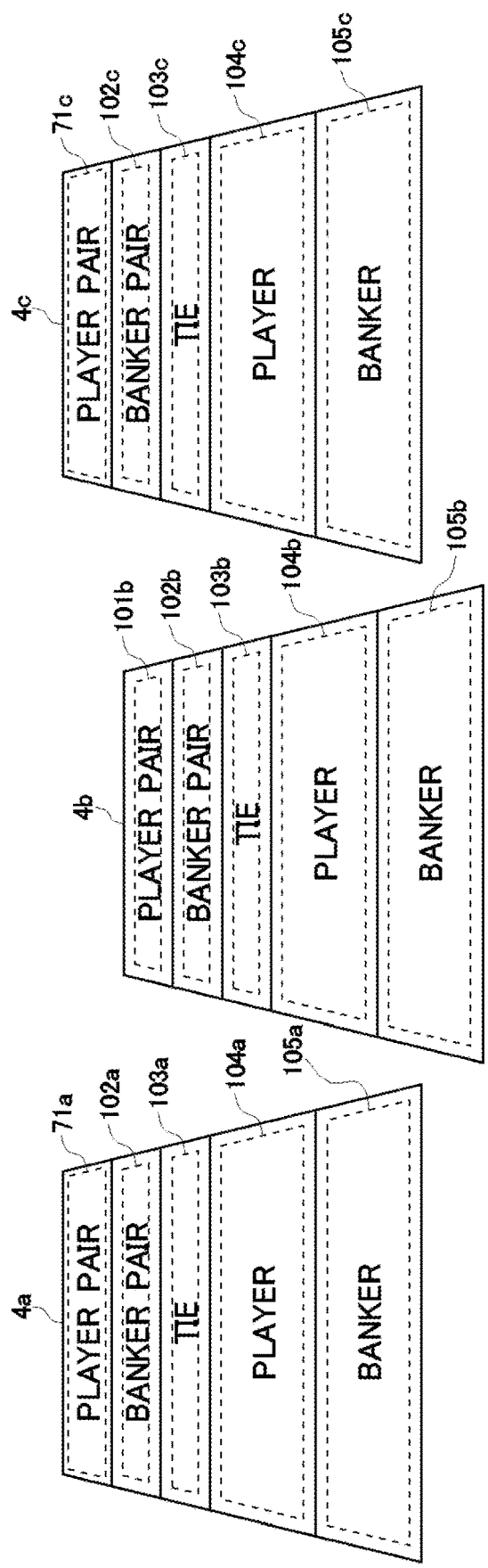
FIG. 8 shows the betting area of the third embodiment of the present invention.

Although the game table reading system in the first, second, and third embodiments describes reading one reading area at a time, the system may be configured to read a plurality of reading areas at a time. In other words, the configuration may be to have a part of a plurality of reading antennas read at the same time, and the read-restriction control device 12 may have a read-restriction antenna between the plurality of reading antennas that read at the same time perform the reading restriction. FIG. 8 will be used to illustrate the following.

FIG. 8 shows an excerpt of betting area 4a, betting area 4b, and betting area 4c from the game table 2 of FIG. 1, and illustrates only the reading antenna 7 and the read-restriction antenna 10 necessary for explanation. For example, when reading the player pair area in betting area 4a and the player pair area in betting area 4c at the same time, the reading control device 9 causes the reading antenna 71a and the reading antenna 71c to read, and the read-restriction control device 12 causes the read-restriction antennas 102a to 105a, 101b to 105b, and 102c to 105c in between those areas to perform read-restriction.

Although the above describes a configuration in which each area within a plurality of betting areas 4 (specifically, the player pair area in betting area 4a and the player pair area in betting area 4c) is read simultaneously, it may be composed that the plurality of betting areas 4 as a whole (e.g., the entire betting area 4a and the entire betting area 4c) is read simultaneously.

This configuration makes it possible for a plurality of reading areas to be read simultaneously by a plurality of reading antennas 7 while avoiding the reading of RFID tags in reading areas other than the corresponding reading areas by the reading antenna 7.

In the game table reading system in all of the above embodiments, the system may also be configured to perform the simultaneous multiple readings described above.

When a plurality of reading areas are read at the same time in this manner, a reading error may occur if all of the plurality of reading antennas 7 that are reading at the same time have not been read, but the reading is moved to the next reading, even though all of the plurality of reading antennas 7 that are reading at the same time have not been completed. Therefore, the game table reading system in the present disclosure causes the reading control device to have another part of the plurality of reading antennas 7 read simultaneously after all of a part of the plurality of reading antennas 7 that are reading at the same time have completed their reading. In this way, it is possible to prevent the reading of adjacent reading areas from being read at the same time.

Thus, in the game table reading system of the present embodiment, the read-restriction control device 12 determines the read-restriction antennas 10 to restrict the reading according to the size of the area to be read by the reading control device 9. Specifically, the larger the area to be read at the same time, the greater the area to be read, the more read-restriction antennas 10 are made to restrict the reading. For example, when each betting area 4 is in the configuration shown in FIG. 2, a plurality of reading antennas 71 to 75 corresponding to a certain betting area 4 may be used simultaneously to read the entirety of said betting area 4 as the reading area, and such reading may be performed in each betting area. In this case, since the entire relatively large betting area is the reading area, the read-restriction control device 12 may cause a larger number of read-restriction antennas 10 in the vicinity of this reading area to restrict the reading. All the reading control device 9 may be made to read all the betting area at the same time. In this case, the read restriction control device 12 causes all read-restriction antennas 10 corresponding to areas other than the betting area to perform read-restriction.

Figure 9:
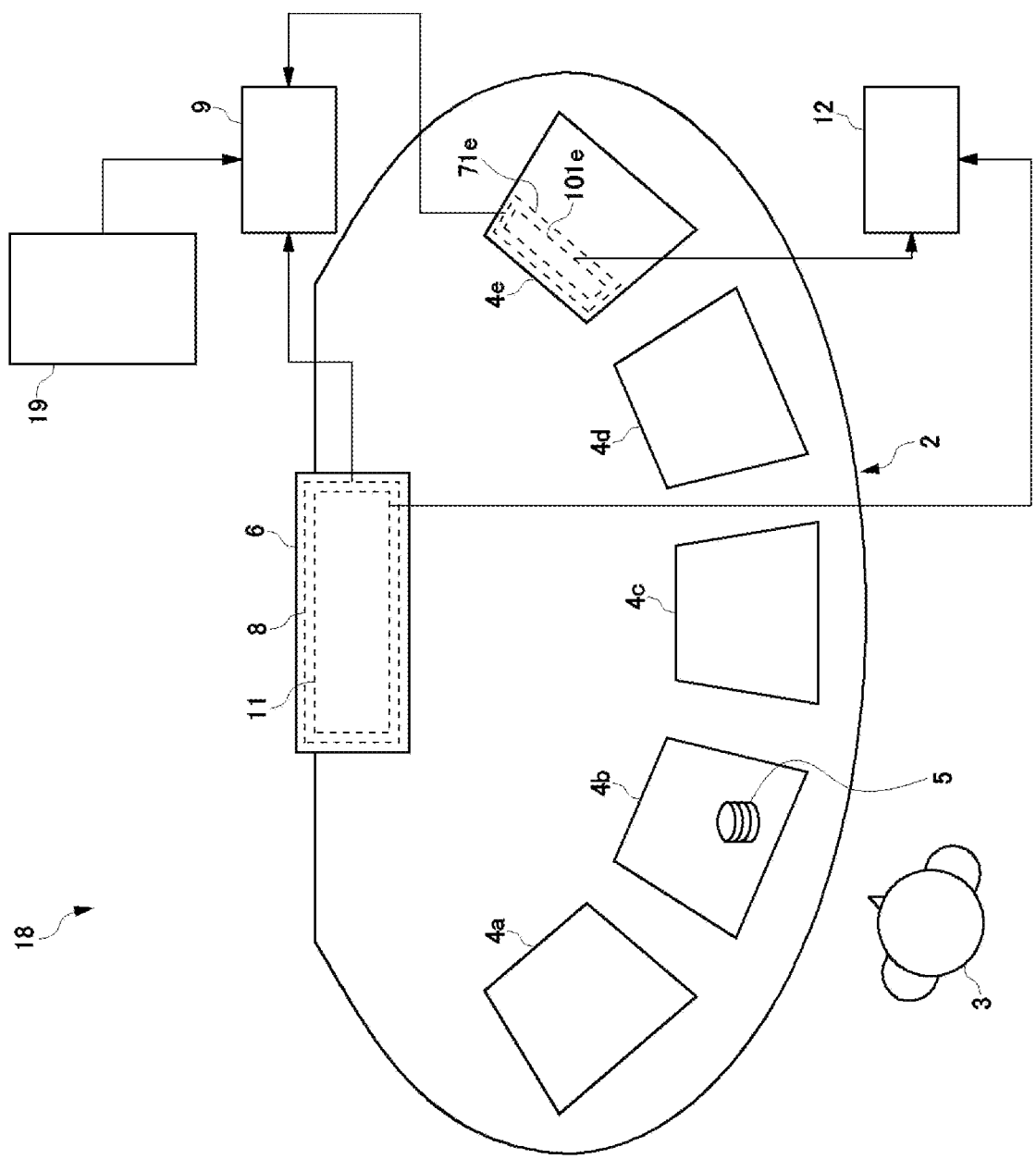
FIG. 9 shows the betting area of a fourth embodiment of the present invention.

FIG. 9 illustrates the configuration of the game table reading system in the fourth embodiment. In addition to the configuration of the game table reading system 1 of the first embodiment, the game table reading system 18 is provided with a game status determination system 19 for determining the progress of the game. The reading control device 9 selects the reading antenna 7 according to the progress of the game as determined by the game status determination system 19 and causes the selected antenna 7 to read.

This configuration makes it possible to determine the area to be read earlier (e.g., to read pair areas first) and to read about the required reading area, depending on the progress of the game, in order to make the game go smoothly.

In the first to fourth embodiments described above, the read-restriction control device 12 has a function to control the read-restriction by the read-restriction antenna 10 so that the reading and the read-restriction are not simultaneously performed in the same reading area in all of the above described readings.

Figure 10:
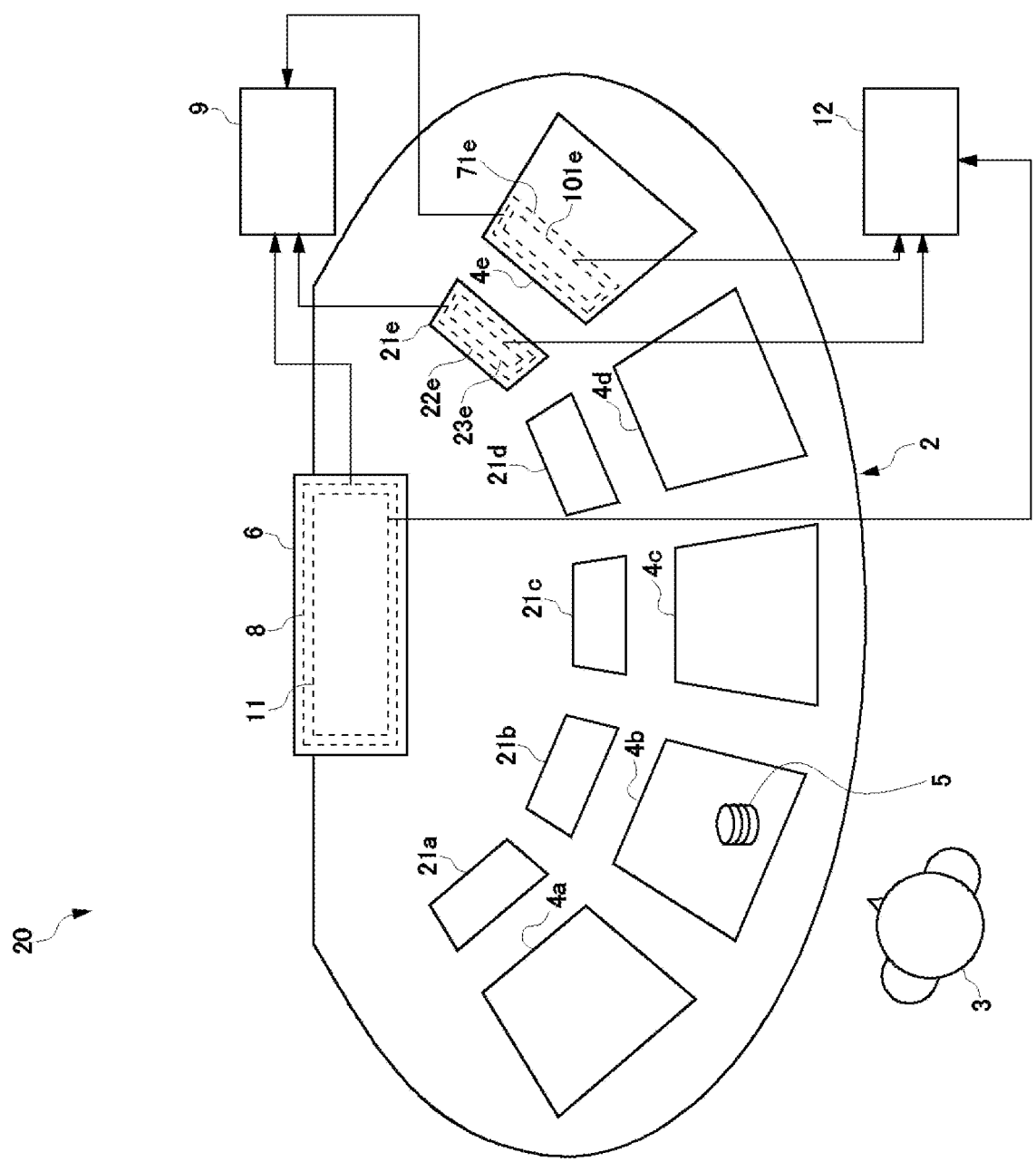
FIG. 10 illustrates the betting area of a fifth embodiment of the invention.

FIG. 10 illustrates the configuration of the game table reading system in the fifth embodiment. In addition to the configuration of the game table reading system 1 in the first embodiment, the game table reading system 20 has a pay area 21a to 21e (hereinafter collectively referred to as "pay area 21"). The pay areas 21a to 21e are the reading areas in which the RFID tags placed therein are read, and, like the reading areas already described, the reading antennas 22a to 22e (hereinafter collectively referred to as "reading antennas 22") and read-restricted antennas 23a to 23e (hereinafter collectively referred to as "read-restricted antennas 23") are provided in each pay area. Although the figure is omitted for ease of viewing, reading antennas other than the reading antenna 22e are also provided in each pay area 21 and are connected to the reading control device 9 in the same manner as the reading antenna 22e. Read-restriction antennas other than the read-restriction antenna 23e are also provided in each pay area 21 and is further connected to the read restriction control device 12 in the same manner as the read-restriction antenna 23e.

In this way, a pay area 21 is provided to read the RFID tags of the game tokens 5 which are paid out of the chip tray 6 separately from the betting areas 4, so that the RFID tags of the game tokens 5 which are paid out of the chip tray 6 can be read quickly.

In FIG. 10, the reading area on the game table 2 is divided into the chip tray 6, the betting area 4, and the pay area 21. In the game table reading system 20 of the present embodiment has a function that, when the reading control device 9 causes the reading antenna 8 of the chip tray 6 to read, the read-restriction control device 12 causes the read-restriction antenna (i.e., the read-restriction antenna 10 and the read-restriction antenna 23) corresponding to the reading area other than the chip tray 6 to perform read-restriction.

This configuration makes it possible to prevent the RFID tags on the game table other than the chip tray 6 from being accidentally read thereby, even if the reading antenna 8 corresponding to the chip tray 6 uses a relatively high intensity electromagnetic wave.

In the game table reading system 20 the read-restriction control device 12 has a function to cause the read-restriction antennas (i.e., the read-restriction antenna 10 and the read-restriction antenna 11) corresponding to the area around the pay area 21 to perform read-restriction when reading is being performed in the pay area 21.

This configuration makes it possible to prevent accidental reading of RFID tags in other surrounding reading areas when reading the pay area 21.

In FIG. 10, the pay area 21 was configured to have the same number of pay areas as the betting area 4, but may be configured to have a smaller number (e.g., one pay area 21 for betting area 4a and betting area 4b, or one pay area 21 for betting areas 4a to 4e, etc.).

In the game table reading systems in the first to fifth embodiments, the reading control device 9 and the read-restriction control device 12 are configured with one reading control device 9 and one read-restriction control device 12, respectively, in the game table 2, but two or more reading control devices 9 and read-restriction device 12 may be provided in the game table 2, respectively, and may be provided for each reading area.

In the game table reading system used in the first to fifth embodiments, the reading control device 9 starts reading the next reading antenna when a predetermined amount of time has passed since no new information is read from the reading antenna performing reading, and the read-restriction control device 12 switches read-restriction antennas to perform read-restriction in synchronization with such a switch of the reading antenna.

This configuration makes it possible to read with high time efficiency while preventing leftover readings, even when a large number of RFID tags are present in the reading area and reading takes a long time, or when there are only a small number of RFID tags in the reading area, or when there are no RFID tags in the reading area and therefor reading is completed in a short time.

In particular, when a plurality of reading areas are read simultaneously using a plurality of reading antennas and the plurality of reading areas performing such simultaneous reading are switched sequentially, the next plurality of reading areas may be read after new information is no longer read in the plurality of reading areas that are read simultaneously. This may prevent the inconvenience of simultaneous reading in adjacent reading areas due to a change in the combination of the plurality of reading antennas performing simultaneous reading.

The reading in the game table reading system in the first to fifth embodiments has a feature that does not allow the reading in the same area and the restriction of the reading to take place at the same time.

In the above embodiments, all of the above reading antennas and read-restriction antennas emit electromagnetic waves during reading and read restriction. The force of the electromagnetic waves must be controlled so that the electromagnetic waves do not reach areas that should not be read. Thus the game table reading system in all embodiments of the present invention is provided with a shielding member that shapes the magnetic field so that the force of the magnetic field generated by the reading antenna is weakened outside the reading area corresponding to that reading antenna. The magnetic field is also dome-shaped.

The above shielding member is made of an aluminum plate, tape, film or sheet, and is provided in the same plane as the reading antenna.

Figure 11:
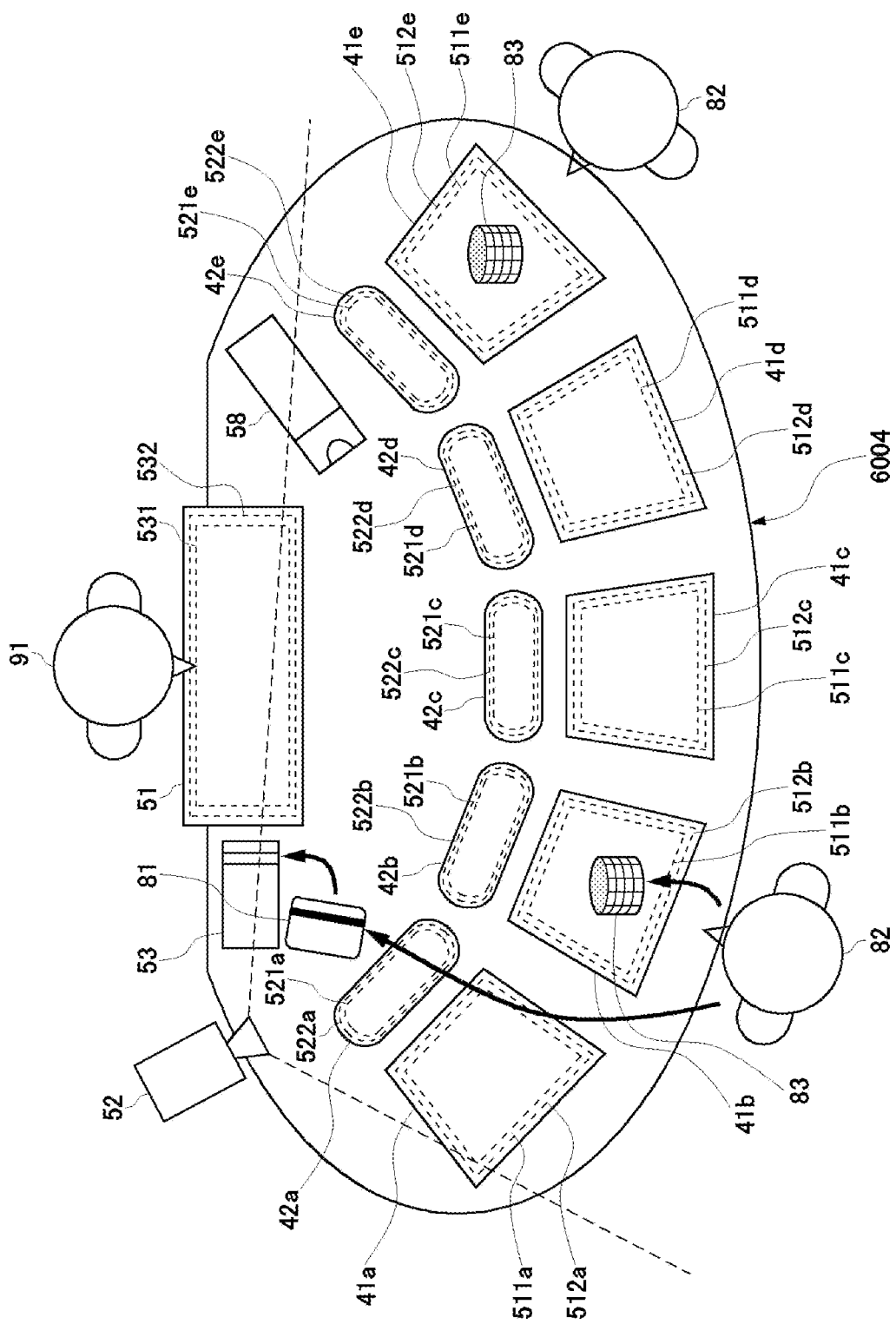
FIG. 11 illustrates a configuration of a game table reading system of a sixth embodiment of the present invention.

FIG. 11 illustrates a game table in the sixth embodiment of the present disclosure. A game table (hereinafter referred to simply as "the table") 6004 has an approximate oval or semicircular shape. One side of the table 6004 is a dealer position (facing the chip tray 51 described below) where the dealer is located, and a plurality of play positions are provided on the other side where the player is positioned to play the game. In the example of FIG. 11, five play positions are provided on the lower side of the table 6004.

The dealer position is provided with a chip tray 51 for housing game tokens 83 possessed by the dealer in the form of embedded in the table 6004. The chip tray 51 is a two-tiered system (double chip tray), and the upper section can be removed to fill or take out the game tokens 83 to/from the lower section.

An RFID tag 831 is embedded in the game token 83 (see FIG. 4), wherein the RFID tag 831 stores at least a chip identification information (hereinafter also referred to as "chip ID") to uniquely identify the game token concerned. The RFID tag 831 may further store information representing a value of said game token.

Each play position has betting areas 41a to 41e (hereinafter collectively referred to as "betting area 41") for a player playing in the relevant play position to wager by placing game tokens 83 on the betting target. The betting area 41 is depicted on an upper surface of table 6004. Adjacent betting areas 41 are separated from each other by one or two lines. The distance between adjacent betting areas 41 is relatively close, and at the closest point the distance is between 0 and 15 cm, preferably less than the diameter of a game token 83.

Although not shown, each of the betting areas 41a to 41e for each play position has: a player pair betting area for betting on a pair being formed on the player's hand; a banker pair betting area for betting on a pair being formed on the banker's hand; a tie betting area for betting that the player's hand and the banker's hand will be tied; a player betting area for betting that the player's hand will win; and a banker betting area for betting that the banker's hand will win, each of which is located close to each other so that they do not overlap. These player pair betting areas, banker pair betting areas, tie betting areas, player betting areas, and banker betting areas are hereinafter referred to as "betting target areas" respectively. Adjacent betting target areas are separated from each other by one or two lines. Alternatively, each betting target area may be demarcated without a line between adjacent betting target areas, by painting adjacent betting target areas in different colors from each other, or by painting the betting target areas in a different color than the background. The distance between the adjacent betting target areas is relatively close, and at the closest point the distance is 0 to 10 cm, preferably less than the diameter of the game token 83.

Each play position has a pay area 42a to 42e (hereinafter collectively referred to as "pay area 42") for reading the payout game tokens when paying out game tokens 83 from the dealer to the player. The pay areas 42 are depicted on the top surface of table 4. Adjacent pay areas 42 are separated from each other by one or two lines. Alternatively, no lines are provided between the adjacent pay areas 42, and the adjacent pay areas 42 may be painted in different colors from each other, or the pay areas 42 may be painted in a different color from the background to demarcate each pay area 42. The adjacent pay areas 42 and the betting area 41 are separated from the adjacent pay areas 42 by one or two lines. Alternatively, no lines may be provided between adjacent pay areas 42 and betting areas 41, and adjacent pay areas 42 and betting areas 41 may be painted in different colors from each other, or pay areas 42 and betting areas 41 may be painted in different colors from the background between them, so that the pay area 42 and betting area 41 are compartmentalized. The distance between adjacent pay areas 42 is relatively close, and at the closest point the distance is between 0 and 10 cm, preferably less than the diameter of the game token 83. The distance between the pay area 42 and the betting area 41 in each play position is also relatively close, and at the closest point the distance is 0 to 15 cm, preferably less than the diameter of the game tokens 83.

The betting areas 41a to 41e are provided with reading antennas 511a to 511e (hereinafter collectively referred to as "reading antennas 511") for reading RFID tags 831 embedded into the game tokens 83 placed in betting areas 41a to 41e, respectively. The pay areas 42a to 42e are provided with reading antennas 521a to 521e (hereinafter collectively referred to as "reading antennas 521") for reading the RFID tags 831 embedded into the game tokens 83 placed in the pay areas 42a to 42e, respectively. The chip tray 51 is provided with a reading antenna 531 for reading the RFID tag 831 embedded into the game token 83 housed in the chip tray 51. As described above, the chip tray 51 adopts the two-tiered system including an upper tray and a lower tray, the reading antenna 531 may be provided on the back side of the upper tray, for example.

In addition, the betting areas 41a to 41e are provided with read-restricted antennas 512a to 512e (hereinafter collectively referred to as "read-restriction antennas 512") for restricting or obstructing the reading of the RFID tags 831 embedded into the game tokens 83 placed in betting areas 41a to 41e, respectively. The pay areas 42a to 42e are provided with read-restriction antennas 522a to 522e (hereinafter collectively referred to as "read-restriction antennas 521") to restrict or obstruct the reading of RFID tags 831 embedded in game tokens 83 placed in the pay areas 42a to 42e, respectively. The chip tray 51 is provided with a read-restriction antenna 532 to restrict or interfere with RFID tags 831 embedded into the game tokens 83 housed in the chip tray 51 from being read by the reading antenna in other areas.

In the present embodiment, the reading antenna 511 and the read-restriction antenna 512 of the betting area 41 are shaped along the outer edge of the betting area 41, and the reading antenna 521 and the read-restriction antenna 522 of the pay area 42 are shaped along the outer edge of the pay area 42, and the reading antenna 531 and the read-restriction antenna 532 are shaped along the outer edge of the chip tray 51, but the shapes of those antennas are not limited to these. In the example of FIG. 11, the read-restriction antenna is provided inside the reading antenna, but the positioning of the read-restriction antenna and the read-restriction antenna is not limited thereto, and the read-restriction antenna may be provided outside of the reading antenna, or the read-restriction antenna may intersect the read-restriction antenna and the reading antenna in plan view. A plurality of read-restriction antennas may be provided for one reading antenna, or conversely, one read-restriction antenna may be provided for a plurality of reading antennas.

A card distribution device 58 is placed on table 6004. The card distribution device 58 houses multiple decks of shuffled playing cards. The dealer 91 can draw cards from the card distribution device 58 one at a time. The card distribution device 58 has a function to read the suit and rank of the drawn cards. The card distribution device 58 determines a game result according to the rules of the baccarat game based on at least the ranks of the drawn cards. The card distribution device 58 displays the determined game result by means of a lamp or the like and outputs the data indicating the game result to the outside system. In this manner, the card distribution device 58 also functions as a game result determination device.

The table 6004 is further equipped with a camera 52 and a card reader 53. The camera 52 takes a picture of the face of the player 82 playing in the playing position and the game tokens 83 on the table 6004. A camera for photographing the face of the player 82 and a camera for photographing the game tokens 83 on the table 6004 may be provided separately.

The card reader 53 reads the information stored in the member's card 81 by scanning the member's card 81 possessed by the registered player (member). The member's card 81 has an RFID tag embedded therein, and the RFID tag stores at least a user ID assigned to the corresponding player. The card reader 53 has an operation section (not shown) wherein the dealer 91 designates a play position. The dealer 91 specifies the play position when scanning the member's card 81 with the card reader 53. This causes the card reader 53 to output a combination of the play position and the user ID. The card reader 53 is also equipped with a cancel operation unit(not shown). The dealer 91 specifies the play position and operates the cancel operation unit when the player 82 leaves the table. This causes the play position and the cancellation instruction to be output from the card reader 53.

At table 6004 as described above, when player 81 plays baccarat, player 82 first sits in one of the playing positions at table 6004 and gives his member's card 81 to the dealer 91. The dealer 91 scans the member's card 81 using a card reader 53. Player 81 bets by placing a game token 83 in one of the betting target area of the betting area 41 in his/her own play position, the betting target area including the player area, banker area, tie area, player pair area, or banker pair area.

When all bets of the player 82 are completed, the dealer 91 closes the bets and draws a card from the card distribution device 58, one card at a time. In baccarat, the player's hand, the banker's hand, the player's hand, and the banker's hand are the first four cards to be drawn, in that order. At this point, if a player pair is not formed, the game tokens bet on the player pair are collected to the chip tray 51 by the dealer 91. If no banker pair is formed at this point, the game tokens bet on the banker pair are collected to the chip tray 51 by dealer 91.

The dealer 91 draws the fifth and subsequent cards, if necessary, according to the rules of baccarat. When the final game result is determined, the dealer 91 collects the losing player's betting game tokens 83 into the chip tray 51, depending on the game result, and then pays out the game tokens 83 from the chip tray 51 for the winning player's betting game tokens 83. At the time of this payout, the dealer 91 first places the game tokens 83 in the pay area 42 of the play position in which the bet game tokens 83 to be paid out were bet, once in the pay area 42, and then places the game tokens 83 to be paid out next to the bet game tokens 83. The winning player receives the game tokens (payout) placed next to the betting game tokens 83 in this manner, along with the bet game tokens. The dealer 91 presses the game start button on the card distribution device 58 when he starts the next game (i.e., when he starts betting on the next game).

Thus, the game table reading system has to perform the reading about at least the game tokens 83 bet on the player pair and the banker pair, before the game tokens bet on the player pair and the banker pair are collected after the dealer draws four cards and, in some cases, the player squeezes the drawn cards. Preferably the reading is completed at the same time for all the bet game tokens 83. For this purpose, the entire betting area must be read within a few seconds. By reading the bet game tokens multiple times, changes can be recognized. For example, after the betting is closed and the first card was drawn from the card distribution device, the player is prohibited from making additional bets, withdrawing the bet game tokens 83, and changing the betting target, respectively. The multiple times of reading allows to determine whether the bet game tokens change during the above period. In addition, the reading may be performed constantly. In this case, the results of the reading of the bet game tokens at the time before the bets are closed may be recorded along with the time data as unconfirmed bet game token data.

Figure 12:
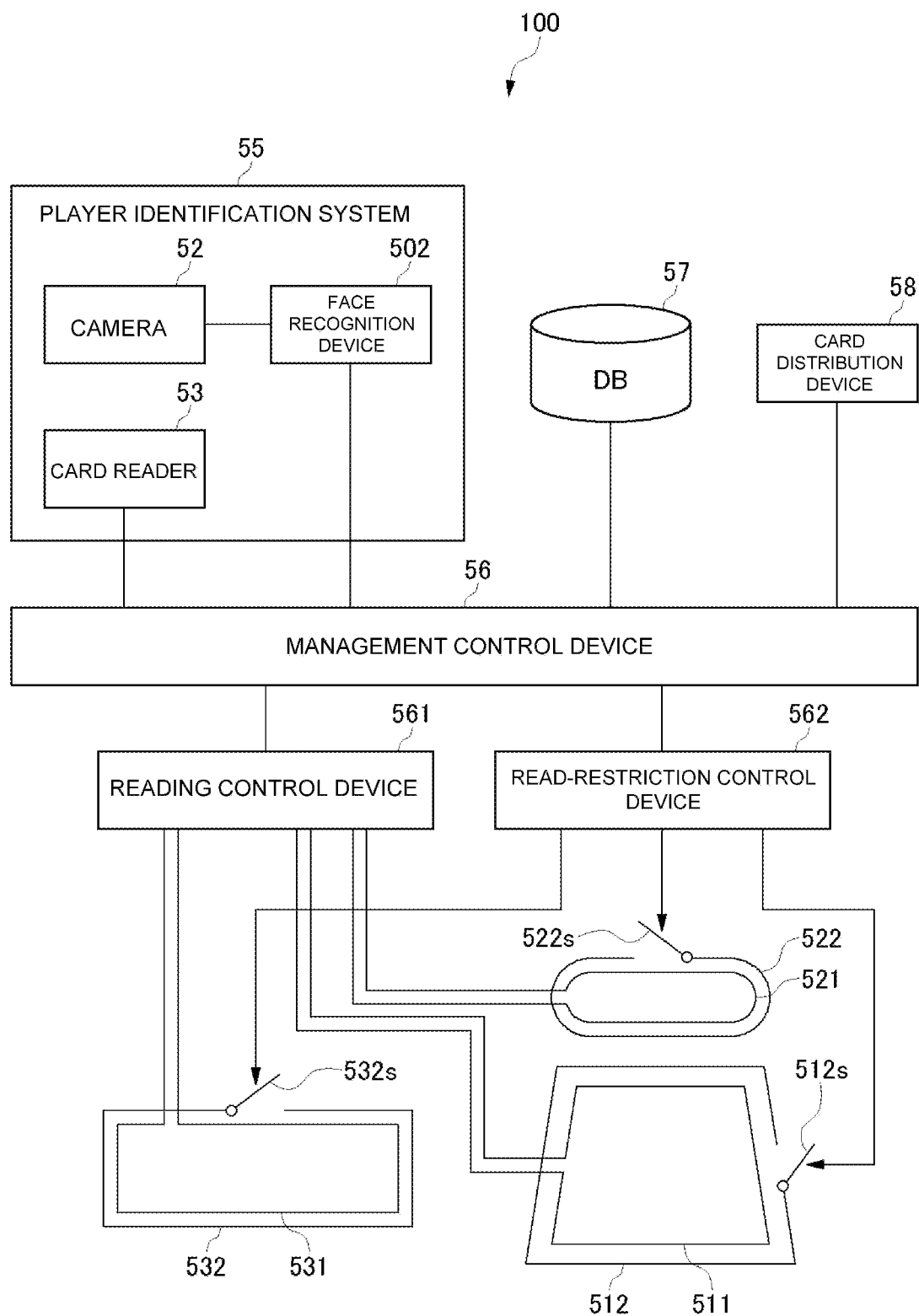
FIG. 12 is a block diagram illustrating the configuration of the game table reading system of the sixth embodiment of the present invention.

FIG. 12 is a block diagram illustrating the configuration of a game table reading system of the sixth embodiment of the present disclosure. The game table reading system 100 has a card distribution device 58, a player identification system 55, a reading control device 561, a read-restriction control device 562, a management control device 56, a database 57, reading antennas 511, 521, 531, and read-restriction antennas 512, 522, 532.

The player identification system 55 comprises a camera 52, a card reader 53, and a face recognition device 502. The face recognition device 502 authenticates the player based on the image of the player's face taken by the camera 52. The face recognition device 502 may use machine learning techniques to perform the face authentication. Based on the position of the player's face, the face recognition device 502 also identifies a position of the authenticated player, i.e., a play position of the authenticated player based on the position of the player's face. In the present embodiment, the player can be identified by the face recognition system including the camera 52 and the face recognition device 502, and the player can also be identified by reading the member's card 81 using the card reader 53, but the player can be identified by any of these means. may be.

The card distribution device 58 outputs the progress of the game (i.e., during dealing, between the end of the game and the next game, during betting, etc.) to the management control device 56 based on the button operation and the rank of the drawn cards read, as well as the game results (player hand wins, banker hand wins, ties, (e.g., a pair of player hands, a pair of banker hands, etc.) is output to the management control device 56.

The reading control device 561 reads the RFID tag 831 in the reading area corresponding to the reading antenna by controlling the reading antennas 511, 521, 531. The read-restriction control device 562 controls the read-restriction antenna 521, 522, 523 so that the RFID tag in the reading area corresponding to the read-restriction antenna is not read by the reading antenna corresponding to the other reading area.

In accordance with the progress of the game from the card distribution device 58, and if necessary, further by referring to the information stored in the database 57, the management control device 56 controls the reading control device 561 and the read-restriction control device 562 to read the RFID tags of the plurality of reading areas in sequence. The management control device 56 associates the information read from the RFID tags at the reading antennas with the players identified by the player identification system 555 and stores the information in the database 57, thereby updating the database 57. Each reading antenna 511, 521, 531 is given antenna identification information (antenna ID) to uniquely identify said reading antennas.

The reading control device 561 transmits a set of information read by the reading antennas 511, 521, 531 and the antenna ID of said reading antenna to the management control device 56. The reading control device 561 may be provided for each reading antenna, in which case the reader identification information (reader ID) for uniquely identifying said reading control device 561 may be sent to each reading control device 561 instead of the antenna ID to the management control device 56.

As shown in FIG. 12, the reading antennas 511, 521, and 531 are shaped as loops that are partially open in the corresponding reading area, and both one end and the other end of the open end of the antenna are connected to the reading control device 561. The reading control device 561 reads the RFID tag by forming an electromagnetic field (magnetic field) in the reading area by passing an electric current through the reading antenna.

One end and the other end of the reading antennas 511, 521, 531 are connected via a switch (not shown) in the reading control device 561, respectively. The reading control device 561 controls the opening and closing of the switch. Specifically, The reading control device 561 opens the loop by releasing the switch for the reading antennas 511, 521, 531 in the reading area that do not read, so that no inductive current due to the electromagnetic field generated by the reading antennas 511, 521, 531 in the other adjacent reading areas does not flow to the reading antennas 511, 521, 531 that do not read.

The read-restriction antennas 512, 522, 532 have a loop shape surrounding the corresponding reading area and have switches 521s, 522s, 532s that close or open the loop. The read-restriction control device 562 opens and closes the switches 521s, 522s, and 532s. The read-restriction antennas 512, 522, 532 exert a read-restriction function when the switches 521s, 522s, and 532s are closed and made a closed loop (when shorted), and do not restrict the reading when the switches 521s, 522s, and 532s are opened and the loop is opened.

Figure 13:
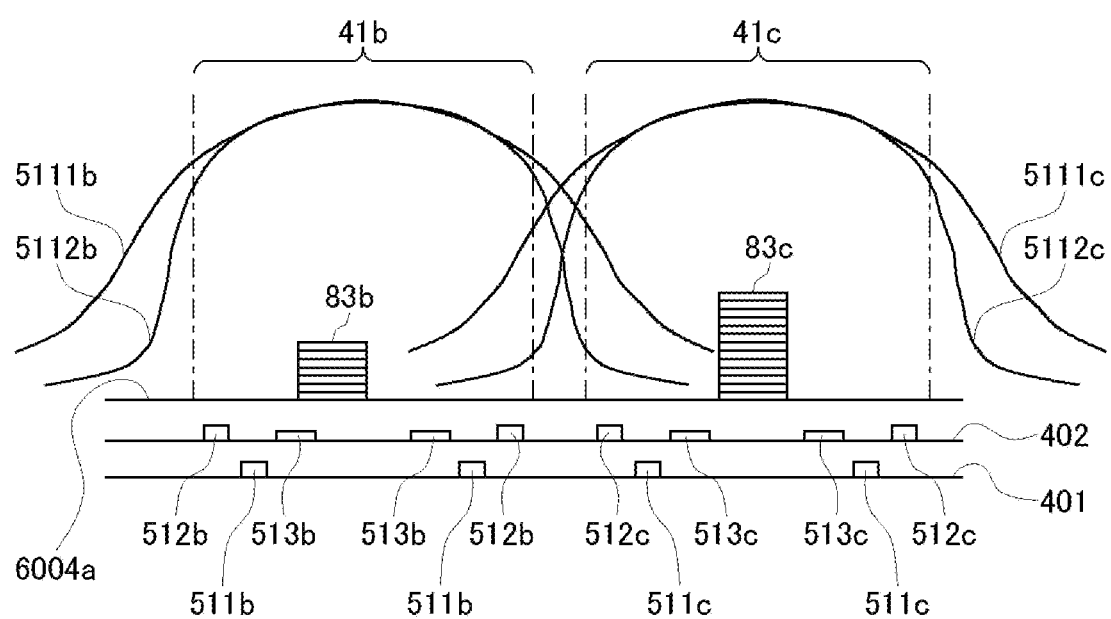
FIG. 13 is a cross-sectional view of a betting area, which is the reading area of the sixth embodiment of the present invention.

FIG. 13 is a cross-sectional view of the betting area 41b and the betting area 41c, which are reading areas. A substrate (or board) 401 for arranging the reading antennas 511 and 521 and a substrate 402 for arranging the read-restriction antennas 512 and 522 are stacked and installed under the surface 6004a of the table 6004. In the present embodiment, the substrate 401 is provided under the substrate 402, but the order of installation can be adopted accordingly. The distance in a vertical direction between the reading antennas 511, 521 and the read-restriction antennas 521, 522 is appropriately set based on the strength of the electromagnetic waves, the shape of the reading antennas 511, 521 and the read-restriction antennas 521, 522, and other factors. Furthermore, the reading antennas 511, 521 and the read-restriction antennas 512, 522 may be provided on the same substrate.

When reading is being performed for reading area 41b, in reading area 41c adjacent to reading area 41b, the switch 512s of read-restriction antenna 512c is closed and a closed loop is formed. At the read-restriction antenna 512c, an electromagnetic field (magnetic field) for restriction (interference) is formed by the induced electromotive force caused by the electromagnetic field (magnetic field) formed by the reading antenna 511b in the adjacent reading area 41b, and the electromagnetic field of the reading antenna 511b is shaped by this restricting electromagnetic field, and the reading of game token 83c placed in the adjacent reading area 41c by the reading antenna 511b is restricted (interfered). That is, the electromagnetic field formed by the reading antenna 511b is in a dome shape, and the electromagnetic field formed by the read-restriction antenna 512c is in a dome shape opposite to the electromagnetic field formed by the reading antenna 511b, and the reading is restricted only to the reading area 41c corresponding to the read-restriction antenna 512c. The game token 83b placed in the reading area 41b corresponding to the energized reading antenna 41b is read by the reading antenna 41b.

FIG. 13 shows the intensity distribution 5111b of the electromagnetic field generated by the reading antenna 511b for the reading of betting area 41b and the intensity distribution 5111c of the electromagnetic field generated by the read-restriction antenna 511c when the betting area 41b is read. FIG. 13 also shows the intensity distribution 5112b when the electromagnetic field generated by the reading antenna 511b is weakened by the electromagnetic field generated by the read-restriction antenna 512c in the neighboring betting area 41c, and the intensity distribution 5112b when the electromagnetic field generated by the reading antenna 511c is weakened by the electromagnetic field generated by the read-restriction antenna 512c in the neighboring betting area 41c.

As shown in FIG. 13, even when the reading antenna 511b generates an electromagnetic field with an intensity distribution 5111b for reading the RFID tag 831 of game token 83b in betting area 41b, by closing the switch of the read-restriction antenna 512c in the adjacent betting area 41c, an inductive current flows through the antenna 512c, which generates an electromagnetic field for read interference, and as a result, the electromagnetic field of the intensity distribution 5111b generated by the reading antenna 511b is shaped so that the electromagnetic field of the intensity distribution 5112b is sufficiently small and flattened within the adjacent betting area 41c, like the electromagnetic field of the intensity distribution 5112b. This prevents the RFID tag 831 of the game token 83c in the betting area 41c from being read by the reading antenna 511b.

An aluminum tape 513b and 513c as a shielding member or blocking means for blocking electromagnetic waves from an adjacent reading area is affixed to the substrate 402. The shielding member may be in a form other than tape, for example, it may be a plate, film, sheet, coated film, foil, etc. The material of the shielding member may be other than aluminum, for example, it may be silver, gold, copper, nickel, or the like, or it may contain aluminum, silver, gold, copper, nickel, or the like. Furthermore, the shielding member may be in a mesh shape. In addition to the read-restricted antennas 512b and 512c, the shield member may also restrict the reading by the reading antennas in the adjacent reading area.

In the example of FIG. 13, the shield member was provided on the substrate 402 for arranging the read-restriction antennas 512b, 512c, but the shield member may be provided on the 401 for arranging the read-restriction antennas 511, 521. Alternatively, the shielding member may be provided on the opposite side of the substrate 402 from the read-restricted antennas 512b and 512c, and may be provided on the opposite side of the substrate 401 from the read-antennas 511b and 511c. Alternatively, the shielding member may be provided in a different plane from the substrate 401 and the substrate 402.

The game table reading system 100 of the present embodiment manages the game token 83 using the database 57. The database 57 stores the information of the RFID tag built into the game token 83 in association with predetermined related information. The management control device 56 updates the database 57 based on the relationship between the information of the RFID tag read by the reading antennas 511, 521, 531 and the reading area in which the RFID tag is read, namely the betting area 41, the betting area 42, and the chip tray 51. Thus, the management control device 56 updates the database 57 for managing the game tokens 83 by the information of the RFID tags of the game tokens 83 read in each reading area of the game table 6004.

Figure 14:
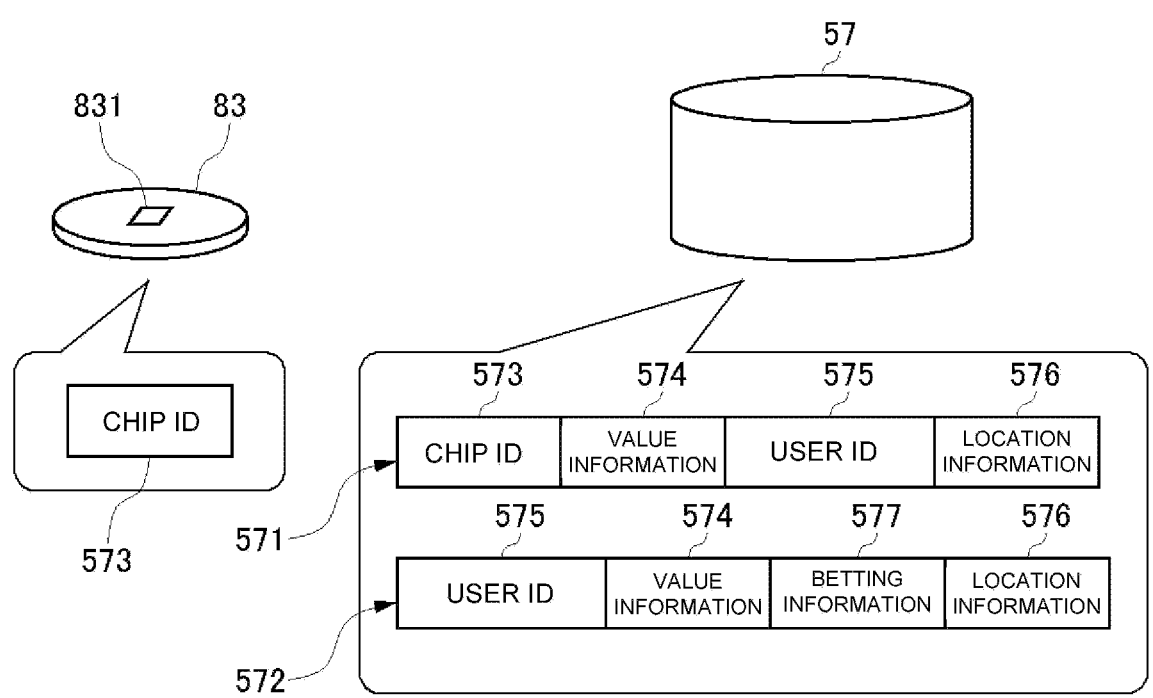
FIG. 14 illustrates a data structure of a game token and database of the sixth embodiment of the present invention.

Hereinafter, the management of the game token 83 by the database 57 will be explained. FIG. 14 illustrates the data structure of the game tokens 83 and the database 57. As described above, the game token 83 has an RFID tag 831 embedded therein. The RIFD tag 831 stores the chip ID 573. The database 57 has two types of tables, including a chip management table 571 for managing the game tokens 83 and a user management table 572 for managing users.

In the chip management table 571, for each game token 83, for the chip ID 573 of the game token 83, the following information as relevant information: price information 574 for the game token 83; user identification information (user ID) 575 to uniquely identify the user who possesses the game token; and location information 576 indicating the location of said game token 83 are associated with the game token 83. Although the price information 574 does not vary with respect to the chip ID 573, the user ID 575 and the location information 576 associated with the chip ID 573 will vary as the game token 83 is used in the casino. Therefore, the database 57 may store certain past user ID and location information in addition to the most recent user ID and location information for the chip ID 573, or it may store only the most recent user ID and location information.

In the user management table 572, for each user, the user's user ID 575 is associated with the following information as relevant information: game token value information 574 of the game token possessed by the user; betting information 577 indicating the history of bets placed by the user in the game; and location information 577 indicating the user's location. The value information 574, the betting information 577, and the location information 576 associated with the user ID 575 will vary as the game token 83 is used in the casino. Therefore, the database 57 may store certain historical value information, betting information, and location information in addition to the most recent value information, betting information, and location information for the user ID 575, or may store only the most recent value information, betting information, and location information.

The game table reading system 100 manages the game tokens 83 by updating the chip management table 571 and user management table 572 in the database 57 based on the information of the RFID tag 831 read by the reading antenna.

In the following description, the management control device 56 updates the database 57, wherein the management control device 56 updates the database according to the information of the RFID tag 831 read by each reading antenna and the status of the game at the time it is read. The management control device 56 obtains information about the status of the game (during the game, betting, settlement, pausing, etc.) from the card distribution device 58 in this embodiment.

First, the management control device 56 updates the chip management table 571 in the database 57 so that the user ID of the user who won the game is associated with the chip ID of the game token 83 that is paid out to the user who won the game. The management control device 56 updates the chip management table 571 in the database 57 so that the user ID assigned to the dealer is associated with the chip ID of the game token 83 that is bet by the user who lost the game. This means that even if the holder of the game token 83 changes as the game token 83 is used in the game, the game token possessed by each user can be identified by referring to the database 57.

The management control device 56 updates the database 57 to associate the chip ID of the game token 83 read at the pay area 42 with a user ID of a user playing in a play position corresponding to the pay area 42. The user ID of a user playing in each play position is identifiable by the player identification system 55 in accordance with the above embodiments.

The management control device 56 specifically, in the chip management table 571 of the database 57, for the record of the chip ID of the game token 83 read in the pay area 42, records the user ID of the user in the play position corresponding to the pay area 42. Updating the database 57 in this manner allows the database 57 to reflect a change in possession from the dealer to the user due to the payout.

In addition, the management control device 56 updates the user management table 572 such that the value of the game tokens 83 to be paid out to the user who won the game is added to the value information 574 associated with the user ID 575 of the user who won the game, and the value of the game tokens 83 to be collected from the user who lost the game is subtracted from the value information 574 associated with the user ID 575 of the user who lost the game. By updating the database 57 in this manner, the value of the game tokens 83 possessed, that is, the amount of money possessed, can be managed in the database 57 for each user.

The management control device 56 updates the database 57 so that when the chip ID of the game token 83 to be paid out is read in the pay area 42, the user ID associated with the game token 83 bet in the betting area 41 corresponding to the pay area 42 is associated with the chip ID of the game token 83 to be paid out.

Alternatively, the management control device 56 updates the database 57 so that when the chip ID of the game tokens 83 to be paid out is read in the betting area 41, the user ID associated with the game token 83 bet in the betting area 41 is associated with the chip ID of the game token 83 to be paid out. This allows the database 57 to be updated so that the holder of the game tokens 83 that have been bet and the holder of the game tokens 83 that will be paid out to said bet game tokens 83 are the same.

The management control device 56 also manages the game tokens 83 as follows when all the play positions are used and there is a player who bets back, i.e., when more than one player bets on a single play position. That is, if the player identification system 55 has identified user IDs for both of the two users simultaneously located in the same play position, the management control device 56 manages the game tokens 83 for each user in the same manner as above, but if the player identification system 55 has identified only one of the two users playing at the same time in the single play position but has not identified the other one, the dealer makes the payment in accordance with an operational rule of paying first to the player whose user ID has been identified. The management control device 56 updates the database 57 to associate the chip ID of the game token 83 that is paid out first to that play position with the user ID identified by the player identification system 55. The management control device 56 associates "unknown" as a user ID with the chip ID of the game token 83 to be paid out later.

A reading antenna and a reading control device 561 for reading the RFID tag 831 embedded into the game token 83 may be provided at each location in the casino facility. In this case, the reading control device 561 may be provided at each location in the casino facility, and the management control device 56 may be able to communicate with a plurality of those reading control devices 561. As described above, the antenna ID of the reading antenna or the reader ID of the reading control device 561 is transmitted from the reading control device 561 to the management control device 56, along with information about the RFID tag 831 read by the reading antenna. The management and control device 56 has a table associated with each antenna ID or each reader ID and information on the location of the corresponding reading antenna (location information, e.g., cage number, table number, chip tray number, gate number, etc. for identifying cage, table, chip tray, gate, etc.).

When the management control device 56 receives the antenna ID (or reader ID) along with the read chip ID from the reading control device 561, the management control device 56 updates the location information 474 associated with the chip ID in the chip management table 571 in the database 57 accordingly. The management control device 56 also updates the location information 576 associated with the chip ID in the user management table 572 associated with the chip ID in the same manner.

Referring to the database 57 allows to know where each game token 83 is located and where each user is located. Also, by storing past information as location information in the chip management table 571 and user management table 572, it is possible to know the history of the movement of the game tokens 83 and the users.

The management control system 56 obtains information on the user ID of the user playing there for each play position from the player identification system 55, and when a bet is placed by placing a game token 83 in the betting area 41 during betting, the management control device 56 obtains the chip ID as information on the RFID tag from the reading antenna 511 of each play position. The management control device 56 uses this user ID and the chip ID to update the user management table 572 in the database 57. Specifically, the management control device 56 refers to the chip management table 571 to obtain the value information 574 of the acquired chip ID 573, and adds the value of the value information 574 to the betting information of the acquired user ID in the user management table 572.

In this way, the management control device 56 updates the database 57 such that the value of the game token 83 read by the reading antenna 511 in the betting area 41 is added to the betting information 577 associated with the user ID 575 of the user identified for the play position corresponding to said reading antenna 511. By updating the database 57 in this manner, the value of the betting game tokens 83, i.e., the bet amount, can be managed in the database 57 for each user. The bet amount may be managed as a corresponding incentive point.

The information stored on the RFID tag 831 of the game token 83, i.e., the chip ID 573, is also used to determine the authenticity of the game token 83. When the information on the RFID tag 831 is read by the reading antenna, the management control device 56 checks the information with the database 57, and if the information is not in the database 57, i.e., if the check is unsuccessful, the game token 83 is determined to be defective or incorrect. If the management control device 56 determines that the game token 83 is defective or incorrect, the management control device 56 outputs a warning. This allows a warning to be output when an illegal game token 83 is used in the game table 6004. The output warning may be output in real time (i.e., at the time when the defect or fraud is determined) in a format perceptible by sight or hearing, or it may be recorded in the recording device along with information on the situation when the fraud or defect occurs (table number, date and time, etc.).

Figure 15:
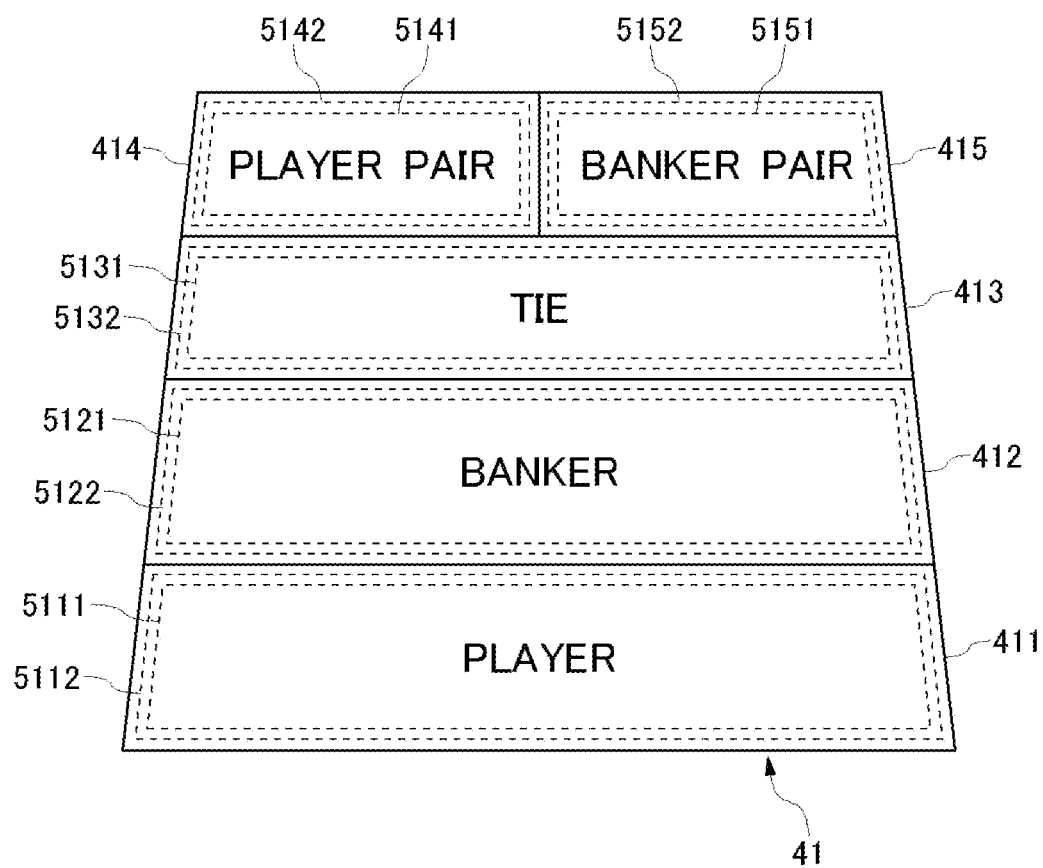
FIG. 15 illustrates another example of a reading antenna and a read-restriction antenna of the sixth embodiment of the present invention.

FIG. 15 illustrates another example of a reading antenna and a read-restriction antenna. In this example, a reading antenna is provided for each play position and for each betting object, i.e., for each a player, banker, and a side bet such as tie or pair. As shown in FIG. 15, each betting area 41 has a plurality of betting target areas, including a player area 411 and a banker area 412, and a tie area 413, a player pair area 414, and a banker pair area 415 as a side betting area, which are provided in close proximity to each play position.

Each betting target area as a reading area, is provided with a reading antenna and a read-restriction antenna, which allows each betting target area to be read separately. That is, the player area 411 is provided with a reading antenna 5111 and a read-restriction antenna 5112, the banker area 412 is provided with a reading antenna 5121 and a read-restriction antenna 5122, the tie area 413 is provided with a reading antenna 5131 and a read-restriction antenna 5132, the player pair area 414 is provided with a reading antenna 5141 and a read-restriction antenna 5142, and the banker pair area 415 is provided with a reading antenna 5151 and a read-restriction antenna 5152.

Thus, by providing each betting target area in each play position as a separate reading area and a reading antenna for each of them, it is possible to determine which betting target the player has bet the game token 83 on in each play position. Thus, in this example, even if a plurality of reading areas are crowded together as shown in FIG. 15, the game table reading system 100 can read the RFID tags 831 for each of those reading areas. The management control device 56 can determine which play position player has won the game, i.e., to which play position the payout should be made, based on the information on the game result in the card distribution device 58 and the information on the betting target obtained from each play position. The management control device 56 can also detect this determination and output a warning when the result of this determination does not match the actual payout.

Figure 16:
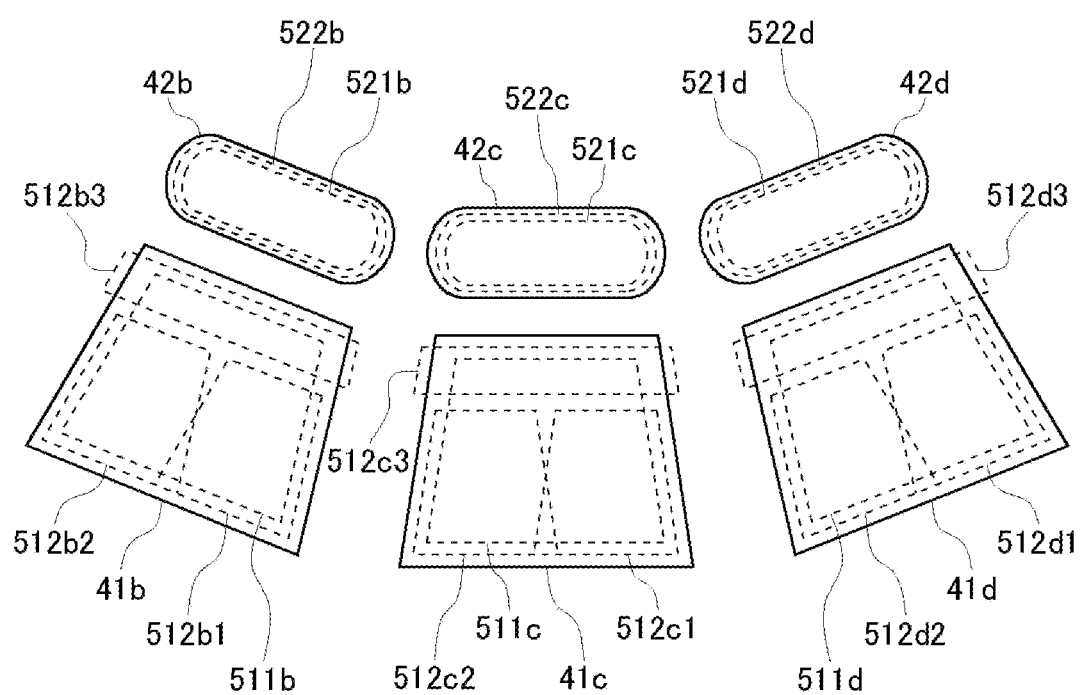
FIG. 16 illustrates another example of the read-restricted antenna of the sixth embodiment of the present invention.

FIG. 16 illustrates another example of a read-restriction antenna. In FIG. 16, only betting areas 41*b*, 41*c*, 41*d* and their corresponding pay areas 42*b*, 42*c*, 42*d* are shown. In this example, a plurality of read-restriction antennas are provided in one reading area, the betting area. These plurality of read-restriction antennas each shape the electromagnetic field generated by the reading antennas in a plurality of other adjacent read areas, respectively.

Specifically, for example, the betting area 41*c* as a reading area, is provided with three read-restriction antennas 512*c*1, 512*c*2, and 512*c*3, in addition to the reading antenna 511*c*, which reads the entire betting area 41*c*. The read-restriction antenna 512*c*1 prevents the RFID tag 831 of the game token 83 placed in the betting area 41*c* from being read by the reading antenna 511*d* of the adjacent betting area 41*d* to the right. The read-restriction antenna 512*c*2 prevents the RFID tag 831 of game token 83 placed in betting area 41*c* from being read by the reading antenna 511*b* in the adjacent betting area 41*b* to the left. The read-restriction antenna 512*c*3 prevents the RFID tag 831 of game token 83 placed in betting area 41*c* from being read by the reading antenna 521*c* of pay area 42*c* adjacent to the upper side.

When the reading control device 561 controls the reading antenna 511*d* to read the betting area 41*d*, the read-restriction control device 562 closes the switch of the read-restriction antenna 512*c*1 in the betting area 41*c* to cause the read-restriction antenna 512c1 to generate electromagnetic waves for interfering with the reading of the tag 831 by the reading antenna 511d. When the reading control device 561 controls the reading antenna 511b to read the betting area 41b, the read restriction control device 562 closes the switch of the read-restriction antenna 512c2 in the betting area 41c to cause the read-restriction antenna 512c2 to generate electromagnetic waves for interfering with the reading of the tag 831 by the reading antenna 511b. When the reading control device 561 controls the reading antenna 521c to read the pay area 42c, the read-restriction control device 562 closes the switch of the read-restriction antenna 512c3 in the betting area 41c to causes the read-restriction antenna 412c3 to generate electromagnetic waves for interfering with the reading of RFID tag 831 by the reading antenna 521c.

Thus, the read-restriction control device 562 closes the switches of the corresponding read-restriction antennas to generate electromagnetic interference in synchronization with the reading control device 561 driving the reading antennas in sequence to perform the reading.

As described above, according to the game table reading system 100 of the present embodiment, when a plurality of reading areas are set up on the game table 6004 at intervals relatively close to each other, it is possible to read which reading area the RFID tags 831 are placed in. Specifically, even when the plurality of betting areas are set up at a close distance from each other, since a reading antenna is provided in each betting area 41, it is possible to prevent the reading antenna from reading the RFID tags 831 in the adjacent betting area 41 or pay area 42. Also, when a pay area 42 is provided for each of the plurality of betting areas 41 and a reading antenna is provided therein, the reading antenna can be prevented from reading the RFID tag 831 in the adjacent pay area 42 or the betting area 41.

In the sixth embodiment of the above, the read-restriction antennas 512, 522, 532 generate an electromagnetic field to interfere with the reading of the corresponding reading area by the induced current due to the electromagnetic field generated by the reading antennas 511, 521, 531 in the adjacent reading area, but instead of this, the electromagnetic field for interference may be generated by passing current from the read-restriction control device 562. Also in this case, a switch to shut off the loop in the read-restriction antenna 512, 522, 532 may be provided to control the read-restriction antenna 512, 522, 532 and the switch may be controlled such that the loop is opened by opening the switch when the reading antennas 511, 521, 531 installed in the same reading area perform reading.

Figure 17A:
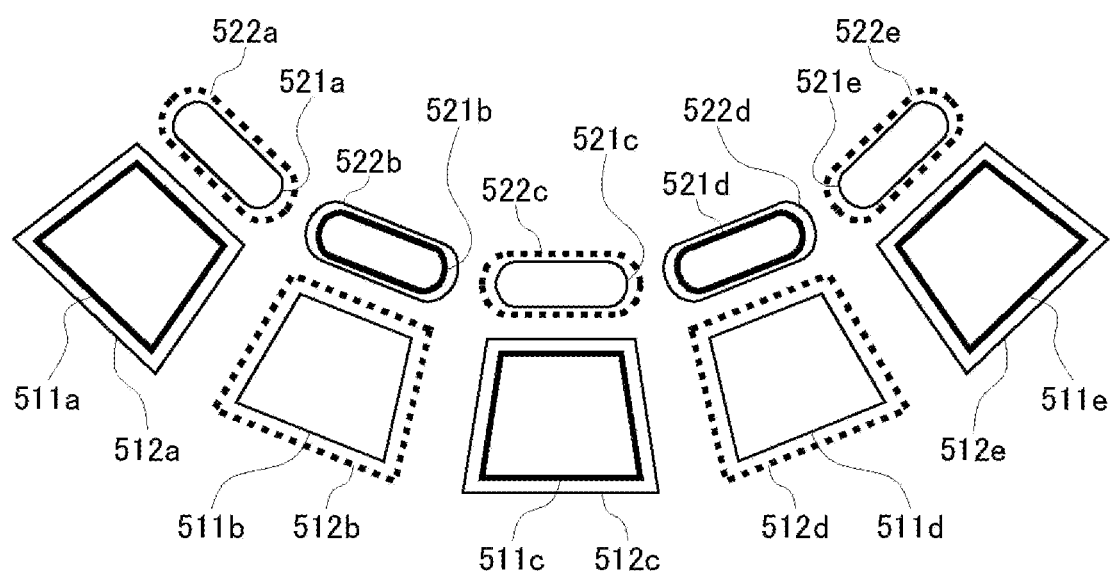
FIG. 17A is a diagram illustrating the switching of the drive of the reading antenna and the reading-limited antenna of the sixth embodiment of the present invention.
Figure 17A:
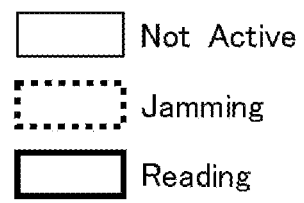
Figure 17B:
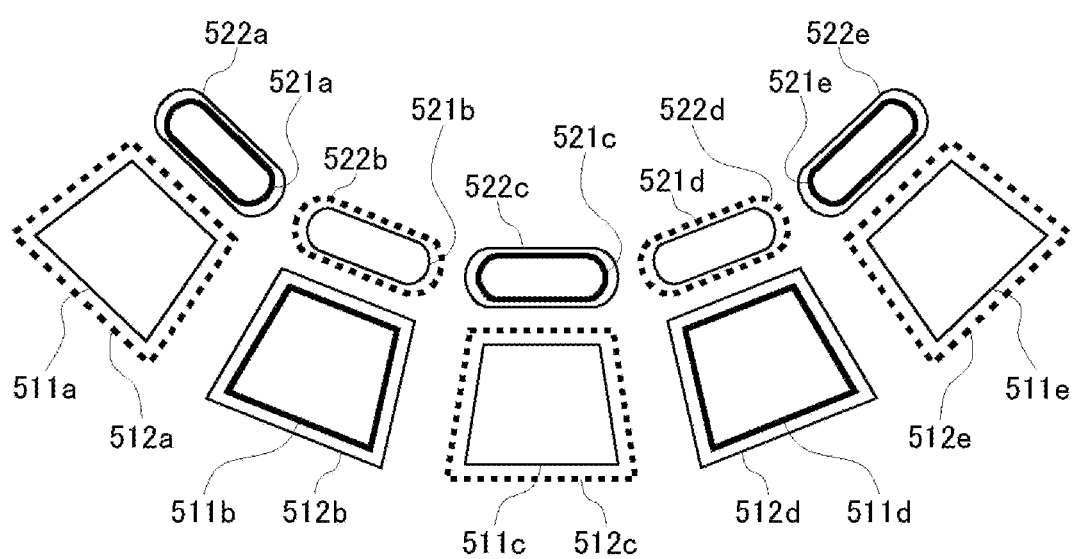
FIG. 17B illustrates the switching of the drive of the reading antenna and the read-restrictioned antenna of the sixth embodiment of the present invention.

FIGS. 17A and 17B illustrate the switching of the drive of the reading antenna and the read-restriction antenna by the reading control device 561 and the read-restriction control device 562. FIGS. 17A and 17B show only the reading antennas 511a to 511e and 521a to 521e, and the read-restriction antennas 512a to 512e and 522a to 522e in the betting area 41a to 41e and the pay area 42a to 42e. In FIGS. 17A and 17B, the reading antennas and the read-restriction antennas shown by the fine solid line indicate that the loop is open and not driven (not active), the reading antennas shown by the thick solid line indicate that it is reading, and the read-restriction antennas shown by the dashed line indicate that the read-restriction (jamming) is in place.

All betting areas 41a to 41e and pay areas 42a to 42e are read by alternately repeating the state of FIG. 17A (first state) and the state of FIG. 17B (second state) by the reading control device 561 and the read-restriction control device 562. Specifically, in the first state of FIG. 17A, the reading antennas 511a, 511c, 511e, 521b, 52d are driven to read betting areas 41a, 41c, 41e and pay areas 42b, 42d, and the read-restriction antennas 512b, 512d, 522a, 522c, 522e are short-circuited to restrict the reading.

In the second state of FIG. 17B, the reading antennas 511b, 511d, 521a, 521c, 521e are driven to read betting areas 41b, 41d and pay areas 42a, 42c, 42e, and the read-restriction antennas 512a, 512c, 512e, 522b, 522d are short-circuited to restrict the reading. Thus, in the first state and the second state, for the reading areas at the upper side, lower side, left side, and right side of the reading area where reading is performed by the reading antenna, the read-restriction antenna is made to short-circuit to perform the reading restriction, thereby restricting the reading of the RFID tags 831 that are not in the reading area read by each reading antenna, while allowing the reading of multiple reading areas at the same time. Thus, by configuring a group with a plurality of reading areas, the reading control device 561 and the read-restriction control device 562 can read all the reading areas efficiently and at a high speed by switching the reading areas to be read in each group.

In the examples in FIGS. 17A and 17B, the plurality of reading areas including betting areas 41a to 41e and pay areas 42a to 42e are divided into two groups, but the plurality of reading areas may be divided into three or more groups. The plurality of reading areas to be grouped according to the game situation may be limited to some reading areas. For example, during payout, only pay areas 42a to 42e may be divided into a plurality of groups, and groups to be read may be switched in order to read for all pay areas 42a to 42e. There may also be groups comprising only one reading area. Since the collection and payment of game tokens are made in sequence from the far right play position to the left or from the far left play position to the right, respectively, it may be possible to focus the reading on the area where the collection and payment would be made.

When switching the reading antennas to read in sequence, the reading time may be fixed for each reading antenna or each group of antennas. In this case, the reading time may be the same for each reading antenna or each group of antennas, or may be set individually. For example, if a group of three groups is created, with a first group as the reading areas for reading in the first state of FIG. 17A, a second group as the reading areas for reading in the second state of FIG. 17B, and a third group as the chip tray 51, the reading time of the third group may be set to be longer than the reading time of the first and second groups.

The management control device 56 may stores a combination table for each reading area that specifies the combination of the reading area or the reading antenna corresponding to the reading area and the read-restriction antenna corresponding to the reading area or such reading area that should be restricted to read when reading is performed in the reading area. Then, when a reading area to be read is determined, the management control device 56 may indicate the determined reading area to the reading control device 561 and refer to the combination table to specify a reading area subject to read-restriction or a read-restriction antenna to be effective, and instruct it to the read-restriction control device 562.

In this case, the management control device 56 may determine the reading area to be read based on the instructions of the operator (e.g., the dealer). The management control device 56 may determine the reading area to be read based on the image obtained by the camera 52. For example, the management control device 56 may analyze the image obtained with the camera 52 and determine to read the reading area where it is determined as a result of the analysis that there has been a variation in the game token 83.

FIGS. 18A to 18E illustrate other examples of switching of the reading area in which reading is performed in a plurality of reading areas simultaneously. In this example, the reading areas to be read are switched in sequence by shifting the positions of a plurality of reading areas that do not interfere with each other, without constituting a fixed group as in the examples of FIGS. 17A and 17B.

Figure 18A:
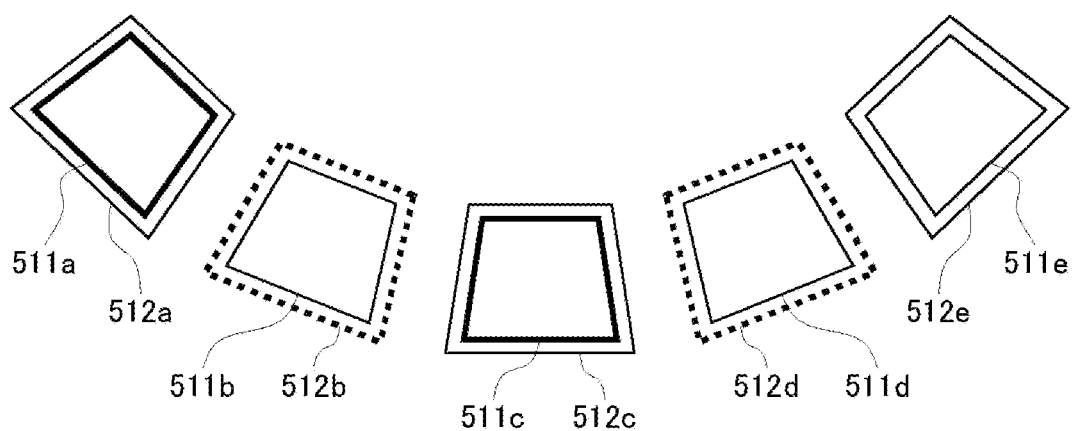
FIG. 18A illustrates the switching of the drive of the reading antenna and the reading-limited antenna of the sixth embodiment of the present invention.
Figure 18A:
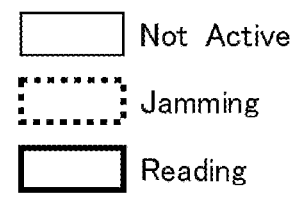
Figure 18B:
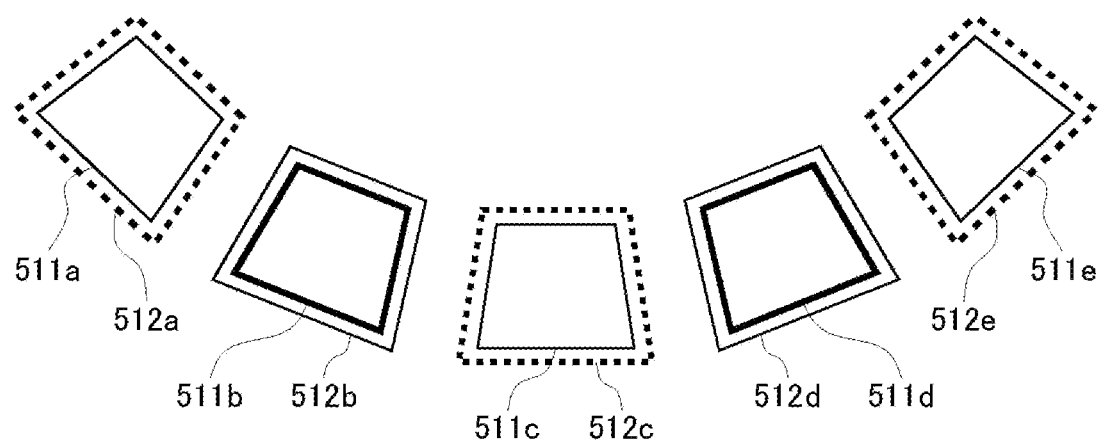
FIG. 18B illustrates the switching of the drive of the reading antenna and the read-restrictioned antenna of the sixth embodiment of the present invention.
Figure 18B:
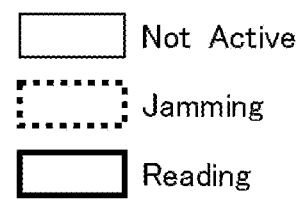
Figure 18C:
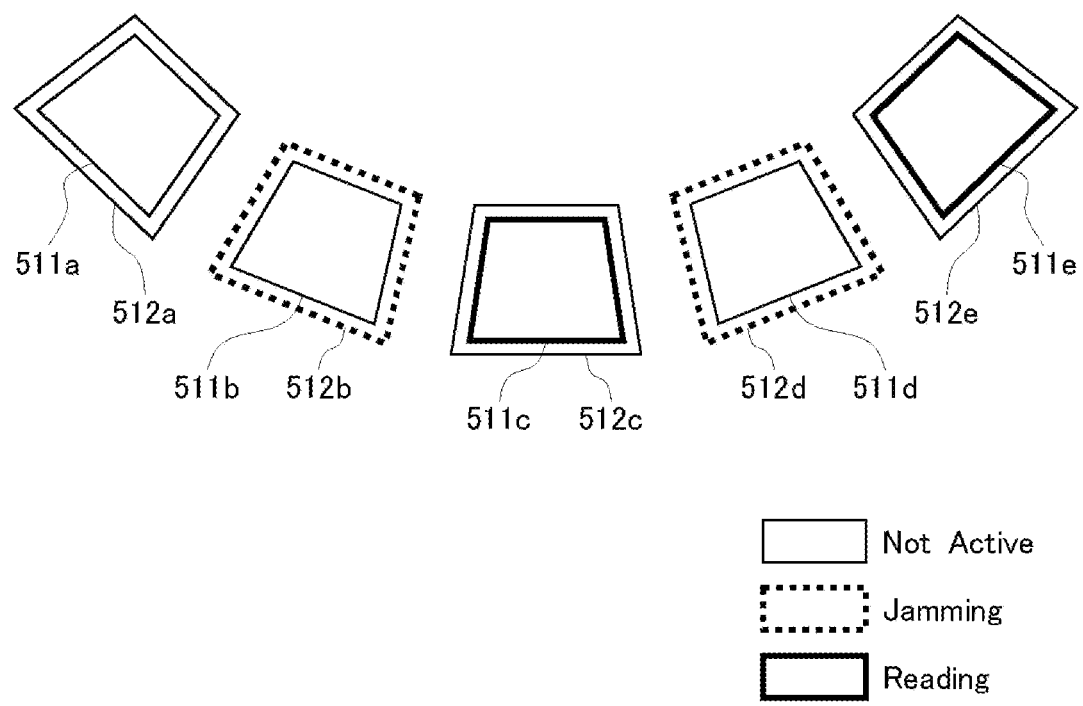
FIG. 18C illustrates the switching of the drive of the reading antenna and the read-restrictioned antenna of the sixth embodiment of the present invention.
Figure 18D:
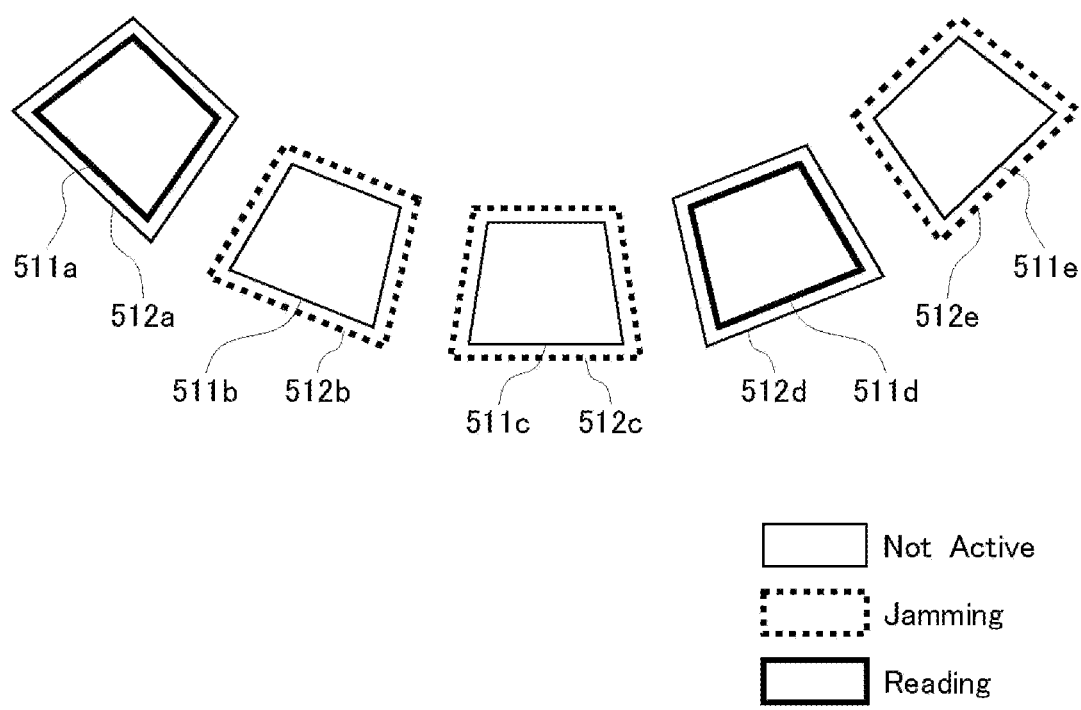
FIG. 18D illustrates the switching of the drive of the reading antenna and the read-restrictioned antenna of the sixth embodiment of the present invention.
Figure 18E:
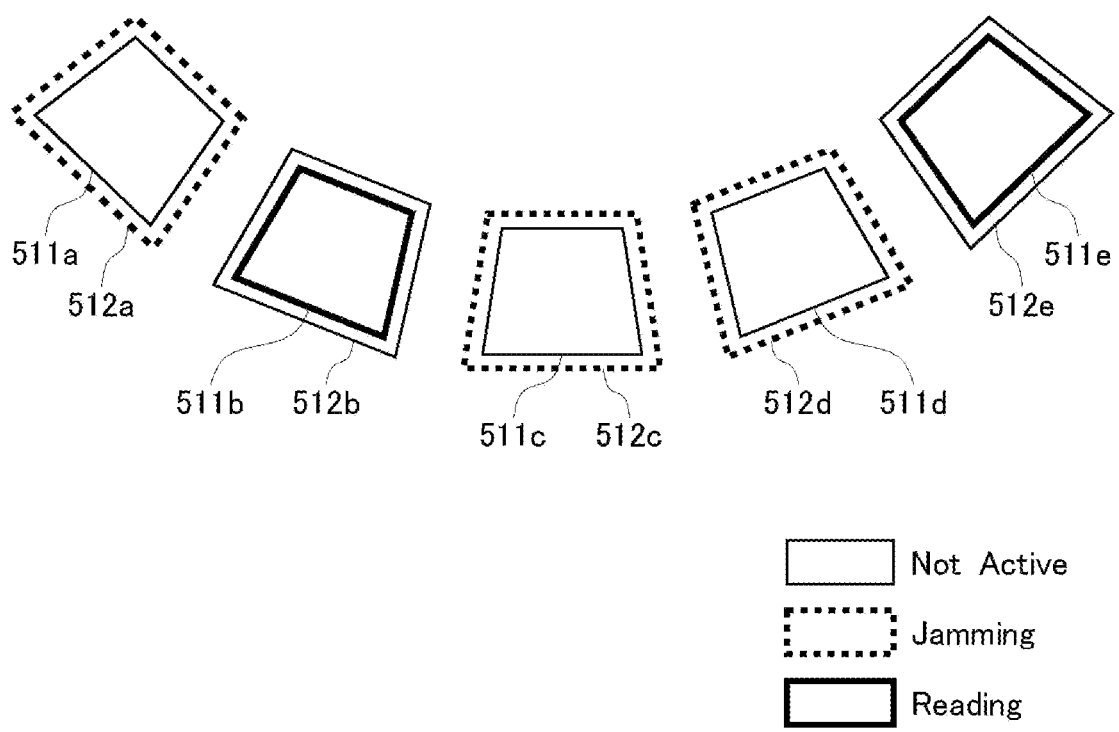
FIG. 18E illustrates the switching of the drive of the reading antenna and the reading-limited antenna of the sixth embodiment of the present invention.

In this example, for betting areas 41*a* to 41*e*, reading areas 41*a* and 41*c* are read as shown in FIG. 18A, then reading areas 41*b* and 41*d* are read as shown in FIG. 18B, then reading areas 41*c* and 41*e* are read as shown in FIG. 18C, then reading areas 41*d* and 41*a* are read as shown in FIG. 18D, then reading areas 41*e* and 41*b* are read as shown in FIG. 18E, and then reading areas 41*a* and 41*c* are read again as shown in FIG. 18A, and the same process will be repeated. In this manner, a plurality of reading areas may be read simultaneously without fixing the combination of reading areas to be read at the same time.

In the above embodiment, adjacent reading areas may touch each other with one line between those reading areas as a boundary, and an area that is not a reading area is sandwiched between adjacent reading areas and may have two lines between adjacent reading areas.

Figure 19:
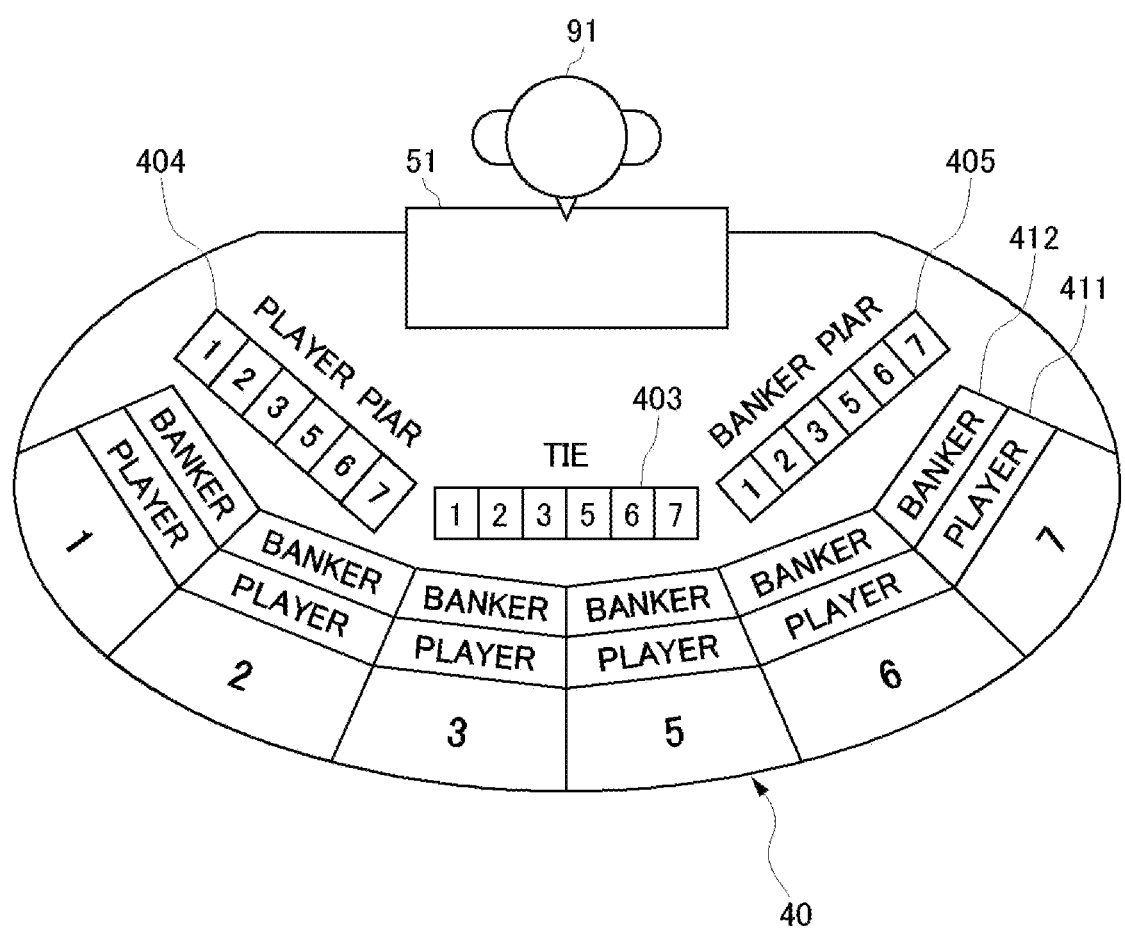
FIG. 19 illustrates another example of a game table layout of the sixth embodiment of the present invention.

FIG. 19 illustrates another example of the layout of the game table of the present embodiment. The game table 40 is provided with six play positions. The play positions are given play position numbers 1 to 7 (except 4). In each play position, a player area 411 and a banker area 412 are arranged. Tie, player pair, and banker pair as side bet, are not in each play position, but are grouped together as tie area 403, player pair area 404, and banker pair area 405, respectively. In other words, the tie area 403, the player pair area 404, and the banker pair area 405 are divided into small areas for each play position respectively.

In this case, a reading antenna and a read-restriction antenna are provided in each play position sub-area in tie area 403, player pair area 404, and banker pair area 405, respectively, and these small areas are each used as a read area to be read and distinguish each play position. The player area 411 and the banker area 412 are also provided with a reading antenna and a read-restriction antenna, respectively, to read and distinguish each of the play positions. In such an arrangement of antennas, to read only RFID tags in the reading area for which each reading antenna is in charge and not read RFID tags in other reading areas, the reading control device 561 and the reading restriction control device 562 switch the reading antennas that read and the read-restriction antennas that performs read-restriction.

For example, the reading control device 561 and simultaneously read small areas of the same play position number in tie area 403, player pair area 404, and banker pair area 405, and the read-restriction control device 562 restrict reading in all other play position number small areas, and the play position number of the small areas to be read may be switched sequentially.

As shown in FIG. 11, a camera 52 may be provided on the table 6004, and the game tokens 83 placed on the table 6004 may be photographed by the camera 52. In this case, a chip recognition device may be further used to recognize the position (reading area), type, and number of game tokens 83 by performing image recognition on the images obtained by the camera 52. The camera 52 takes a picture of the game tokens 83 placed on the table 6004 from an angle upwards. The game tokens 83 have different color bands on the side surfaces, depending on the type, so that the type can be visually determined when the sides are observed. The chip recognition device recognizes the position, type, and number of game tokens 83 by using a combination of image recognition techniques such as neural networks, pattern matching, and the like as appropriate.

The management control device 56 uses the recognition result by the chip recognition device and the reading result obtained from the reading control device 561 to figure out how many game tokens of which type are placed where. At this time, if the recognition result by the chip recognition device and the reading result obtained by the reading control device 561 do not match, the management control device 56 may record or output a warning. In particular, if the information of the game token 83 recognized by the chip recognition device is not obtained by the reading control device 561, it means that there is a game token 83 that does not have a valid RFID tag 831, and in this case, the warning may be output as an invalid game token.

In the sixth embodiment, the database 57 was updated to track the movement of the game tokens 83 by figuring out which game tokens 83 with which chip IDs were placed in which position in the table 6004, but the purpose of employing the technology of the present embodiment is not limited to this, and for example, a system may be constructed to detect fraud by determining where the game tokens 83 having which chip ID are placed in the table 6004. In this fraud detection system, the management control device 56 may determine that there has been a fraud when, for example, there is an increase or decrease of the game token 83 in the betting area 41 or a movement of the game token 83 in the betting area 41 between the start of card drawing and the end of settlement.

Figure 20:
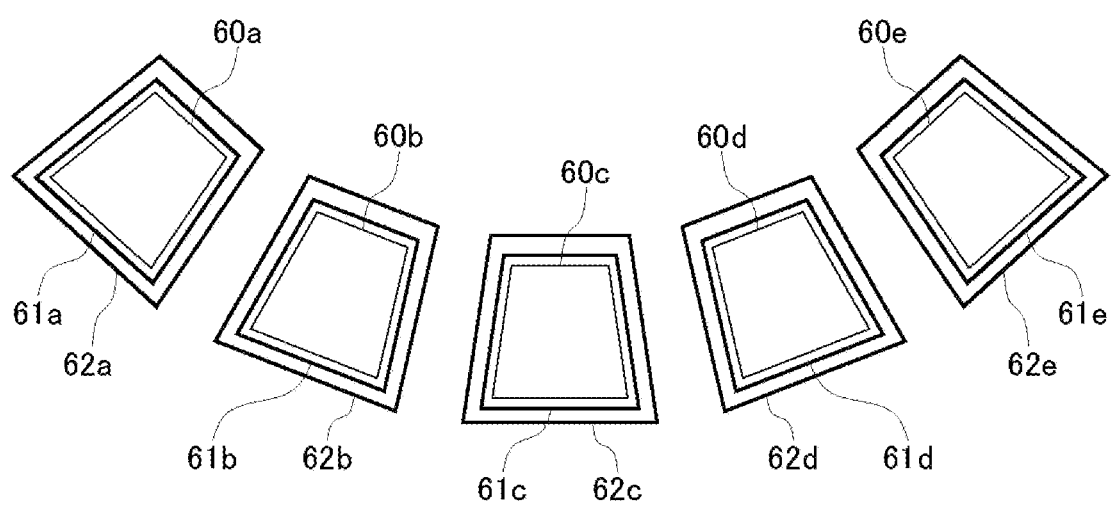
FIG. 20 illustrates an example of the layout of an antenna in the seventh embodiment of the present invention.

FIG. 20 illustrates an example of an antenna arrangement of the seventh embodiment of the present invention. In FIGS. 20 to 24 below, the wiring from the reading antenna to the reader and the switch of the read-restriction antennas are omitted. In the example of FIG. 20, one reading antennas 61*a* to 60*e* (hereinafter collectively referred to as "Reading Antenna 61") are provided for betting areas 60*a* to 60*e* (hereinafter collectively referred to as "betting area 60") of each play position. An external read-restriction antenna 62*a* to 62*e* is provided in the betting area 60*a* to 60*e* of each play position, enclosing the reading antennas 61*a* to 61*e*. These external read-restriction antennas 62*a*-62*e* are closed at all times and have the effect of jamming at all times. In particular, for example, when the reading antenna 61*a* is reading the betting area 60*a*, the external read-restriction antenna 62*a* for the betting area 60*a* prevents the reading antenna 61*a* from reading the RFID tag 831 of the game token 83 placed in the other adjacent betting area 60*b*, etc., by inducing a current to generate a disturbing magnetic field. Since the reading antenna 61*a* and the external read-restriction antenna 62*a* are sufficiently far apart from each other, this disturbing magnetic field does not prevent the said reading antenna 61*a* from reading the RFID tag 831 of the game token 83 in the corresponding betting area 60*a*.

Thus, if the betting areas 60*a* to 60*e* as a plurality of reading areas are located sufficiently far from each other, then it is effective to set the always-closed external read-restriction antennas 62*a* to 62*e* with sufficient spacing, which enclose the reading antennas 61*a* to 61*e*, respectively. In the present embodiment, since the reading antenna 61 is wired in an area larger than the betting area 60, the RFID tag 831 of the game token 83 placed somewhat out of the betting area 60 can also be read reliably.

Figure 21:
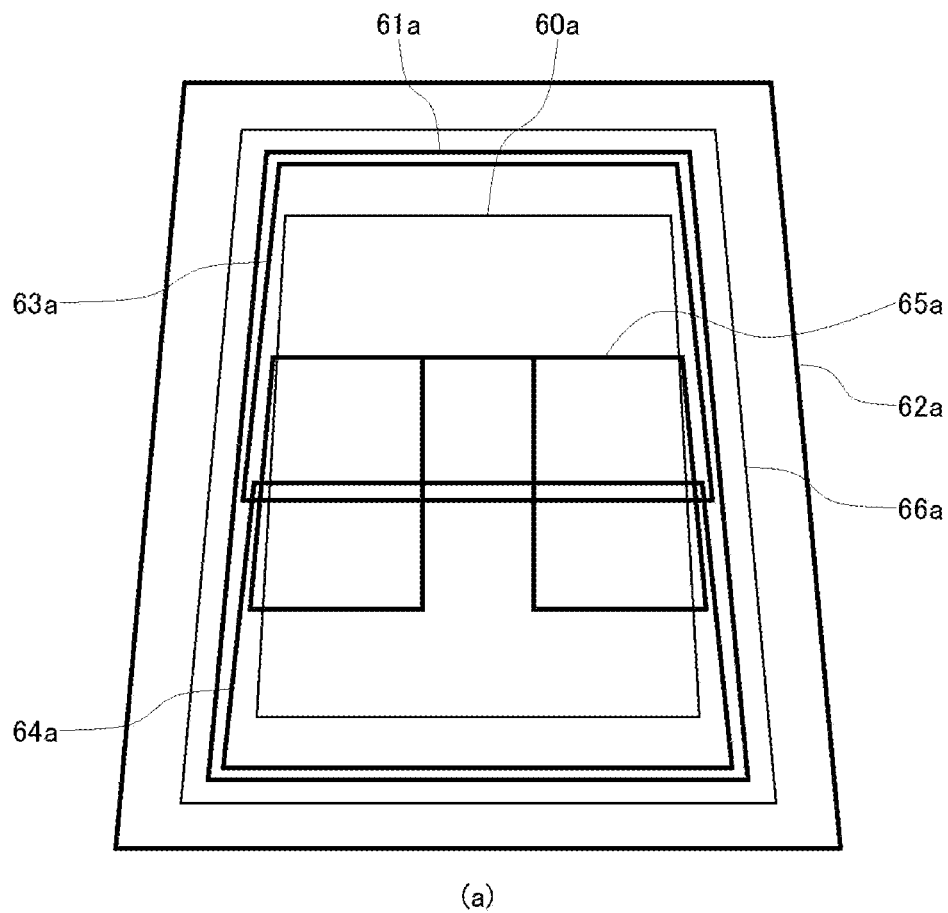
FIG. 21 illustrates a configuration of an antenna in one play position of the seventh embodiment of the present invention.
Figure 21:
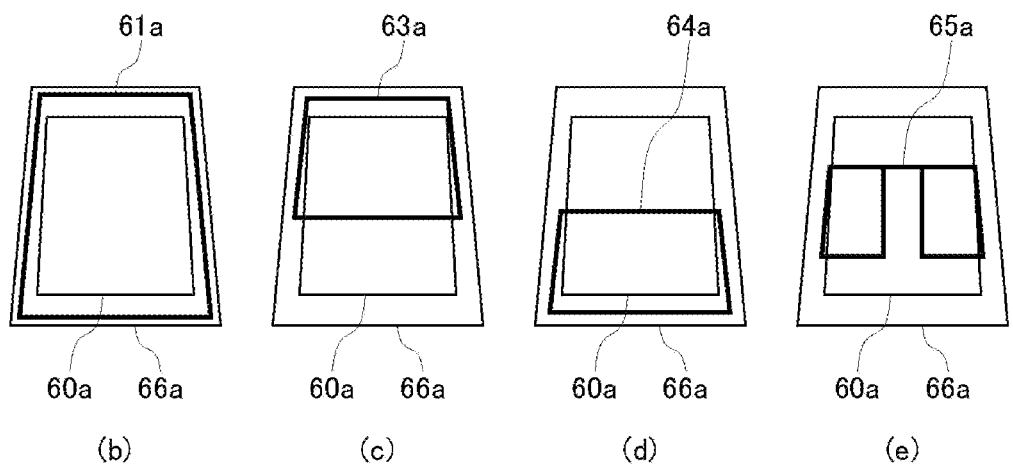

FIG. 21 illustrates the configuration of the antennas of one play position of the seventh embodiment of the disclosure.

All antennas are depicted in FIG. 21(a), and in FIGS. 21(b) through 21(e), together with the betting area 60a and the board 66a, the reading antenna 61a (FIG. 21(b)), the read-restriction antenna 63a (FIG. 21(c)), the read-restriction antenna 64a (FIG. 21(d)), the reading restriction antenna 65a (FIG. 21(e)) is shown, respectively. As shown in FIG. 21, one substrate 66a is provided for the betting area 60a, and one external read-restriction antenna 62a is provided surrounding the substrate 66a. One reading antenna 61a and a plurality of read-restriction antennas 63a to 65a are provided on the substrate 66a.

The plurality of read-restriction antennas 63a to 65a are antennas that open and close by a switch and are located in positions corresponding to the interior of the betting area 60a, which is the reading area. The read-restriction antenna 63a is wired in the upper half of the betting area 60a, the read-restriction antenna 64a is wired in the lower half of the betting area 60a, and the read-restriction antenna 65a is wired in the central left and right areas of the betting area 60a. Thus, the read-restriction antennas 63a to 65a are arranged to cover all of the betting area 60a, which is the reading area, and the read-restriction antennas are arranged locally in areas that are easily read by other reading antennas. Specifically, since it is easily affected on the left and right sides of the central area by the reading antennas for the other areas, the read-restriction antenna 65a is wired so as to be located on the left and right sides of the central area.

The reading of the reading area by the reading antenna 61 and the ON/OFF of the jamming function by opening and closing the switches of the read-restriction antennas 63 to 65 are both controlled by an RFID reader not shown. When a plurality of reading areas are read at the same time using a plurality of reading antennas 61, a plurality of RFID readers may be provided for more than the number of simultaneous readings, and those plurality of RFID readers may be synchronized with each other to control the timing of on/off of the reading and jamming functions.

Thus, in the present embodiment, the entire betting area 60a is divided into small areas, and a plurality of read-restriction antennas 63a to 65a perform jamming for the small areas respectively thereby for the entire betting area 60a. These read-restriction antennas 63a to 65a perform the jamming function by closing the switch to form a closed circuit when the reading antenna 61b and the other reading antennas of the other betting area 60b and the like are reading. When the reading antenna 61a of the betting area 60a is reading, the read-restriction antennas 63a to 65a of said betting area 60a are switched open and do not function as jamming antennas. The read-restriction antennas 63a to 65a in the betting area 60a are opened only when the betting area 60a is being read, and when the reading is being performed in an area other than the betting area 60a, the switch is closed and a closed circuit is formed. It is the same as in the above embodiment that two betting areas, e.g., the betting area 60a and the betting area 60c, which are opened a sufficient distance apart, may be read at the same time.

Once the reading of betting area 60a is completed by the reading antenna 61a, the betting area 60b as another reading area, is then read, specifically in this case, when the reading of betting area 60a is completed, the system (1) turns off energizing of the reading antenna 61a in betting area 60a, and then (2) closes the switches on the read-restricted antennas 63a-65a in the betting area 60a (turning on the jamming function), and also (3) open the switch on the read-restricted antenna 63 in the betting area 60b (turning off the jamming function), and then (4) turns on energizing of the reading antenna 61 for the betting area as a next reading area. This procedure allows the jamming of the betting area 60a to function reliably before starting to read at the betting area 60b, and prevents errors in reading when switching the reading area to be read.

One reading area (one reading antenna) will be judged to have completed reading of the relevant reading area (reading antenna) when the reading is stable after repeated multiple readings. At this time, the RFID reader as a reading control device that performs reading will read only a new RFID tag 831 by designating the identification information of the RFID tag 831 that has already been read out in multiple readings as already read. Accordingly, when the RFID reader no longer reads the new RFID tag 831 after repeating the reading, the RFID reader judges that the reading has been stabilized and judges that the reading of the relevant reading area (reading antenna) has been completed. Alternatively, a read flag may be placed on the read RFID tag 831 to avoid duplicate readings. Alternatively, when the RFID reader reads the RFID tag in duplicate each time in a plurality of readings, the RFID reader determines that the reading of the reading area (reading antenna) is complete when the reading results are consecutive for a predetermined number of times (e.g., two or three times).

Figure 22:
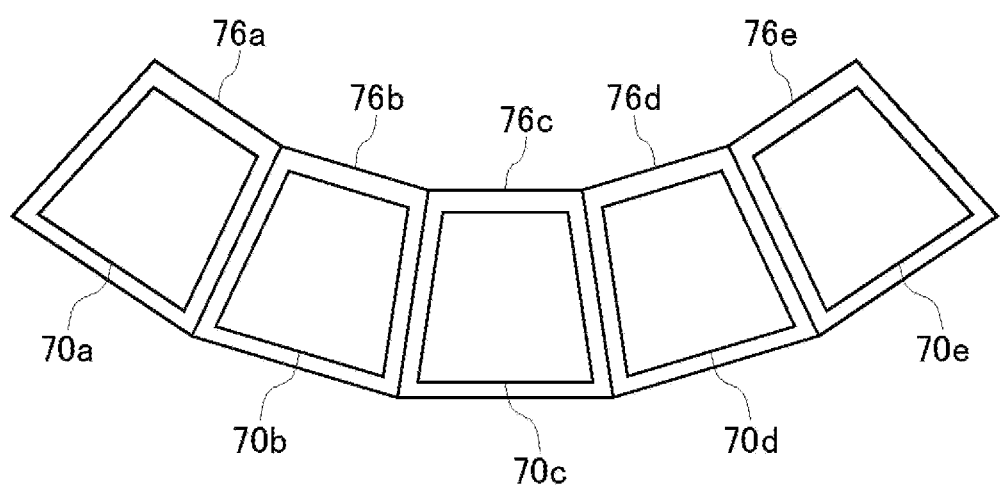
FIG. 22 illustrates a configuration of the antenna of an eighth embodiment of the invention.
Figure 23:
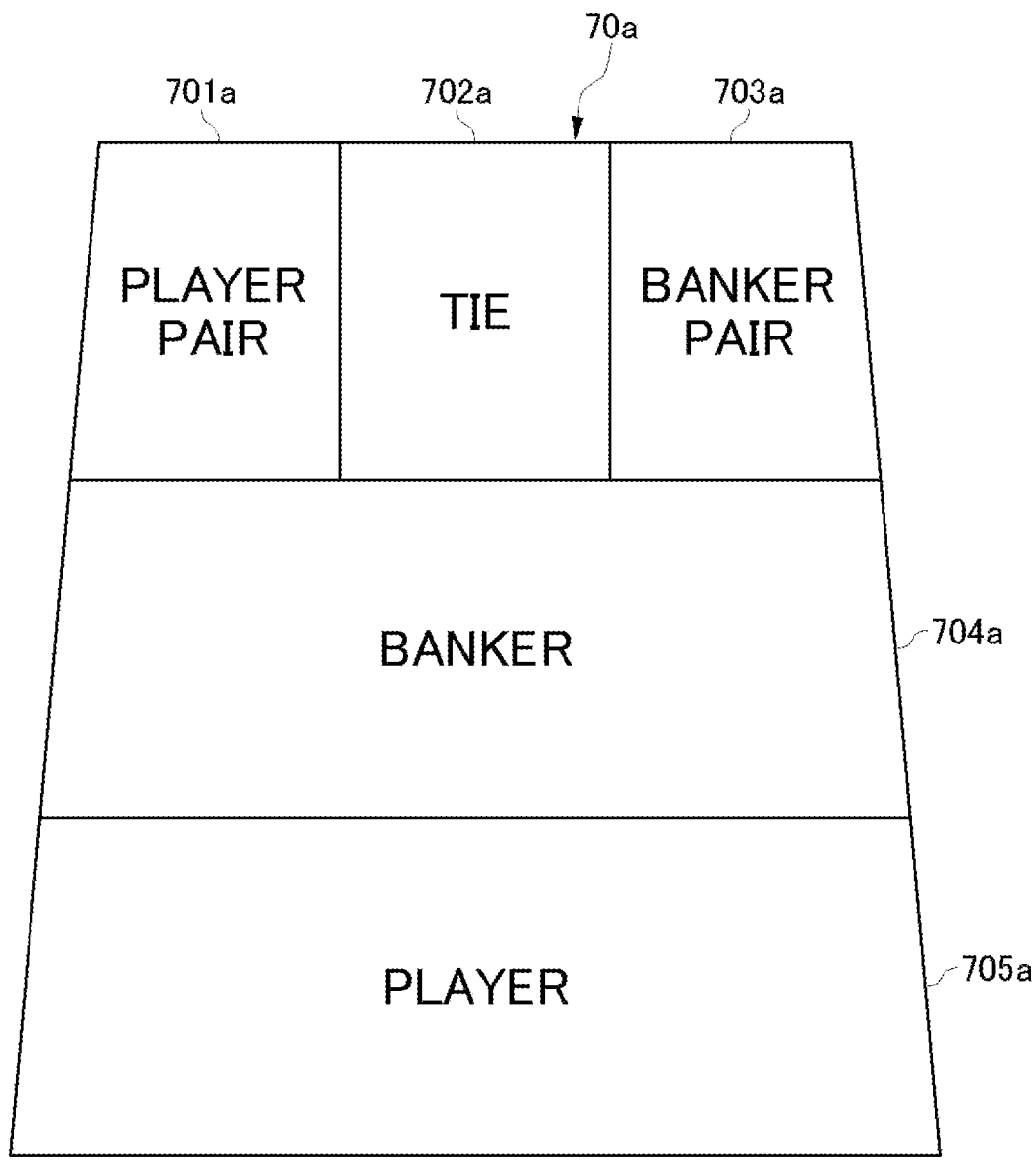
FIG. 23 illustrates a betting area of the eighth embodiment of the present invention.

FIG. 22 illustrates the arrangement of the antennas in the eighth embodiment of the present disclosure. The example of FIG. 23 shows the substrates 76a to 76e of the antennas corresponding to a plurality of betting areas 70a to 70e, each of which corresponds to a plurality of play positions. In the example of FIG. 23, the substrates 76a to 76e are located at a very close distance from each other or in contact with each other. In the example of FIG. 23, the substrates 76 to 76e are slightly larger than the betting areas 70a-70e, respectively.

FIG. 23 illustrates a betting area in the eighth embodiment of the present disclosure. In FIG. 23, betting area 70a is shown as representative of betting area 70a, but the same is true for betting areas 70b to 70e. Betting area 70a has a relatively small player pair area 701a, a tie area 702a, and a banker pair area 703a side-by-side in the upper section, a relatively large banker area 704a is provided in the middle section, and a relatively large player area 705a is provided in the lower section. In other words, the player pair, tie, and banker pair, called side bets, are located relatively far from the players and are designed to be relatively small.

Figure 24:
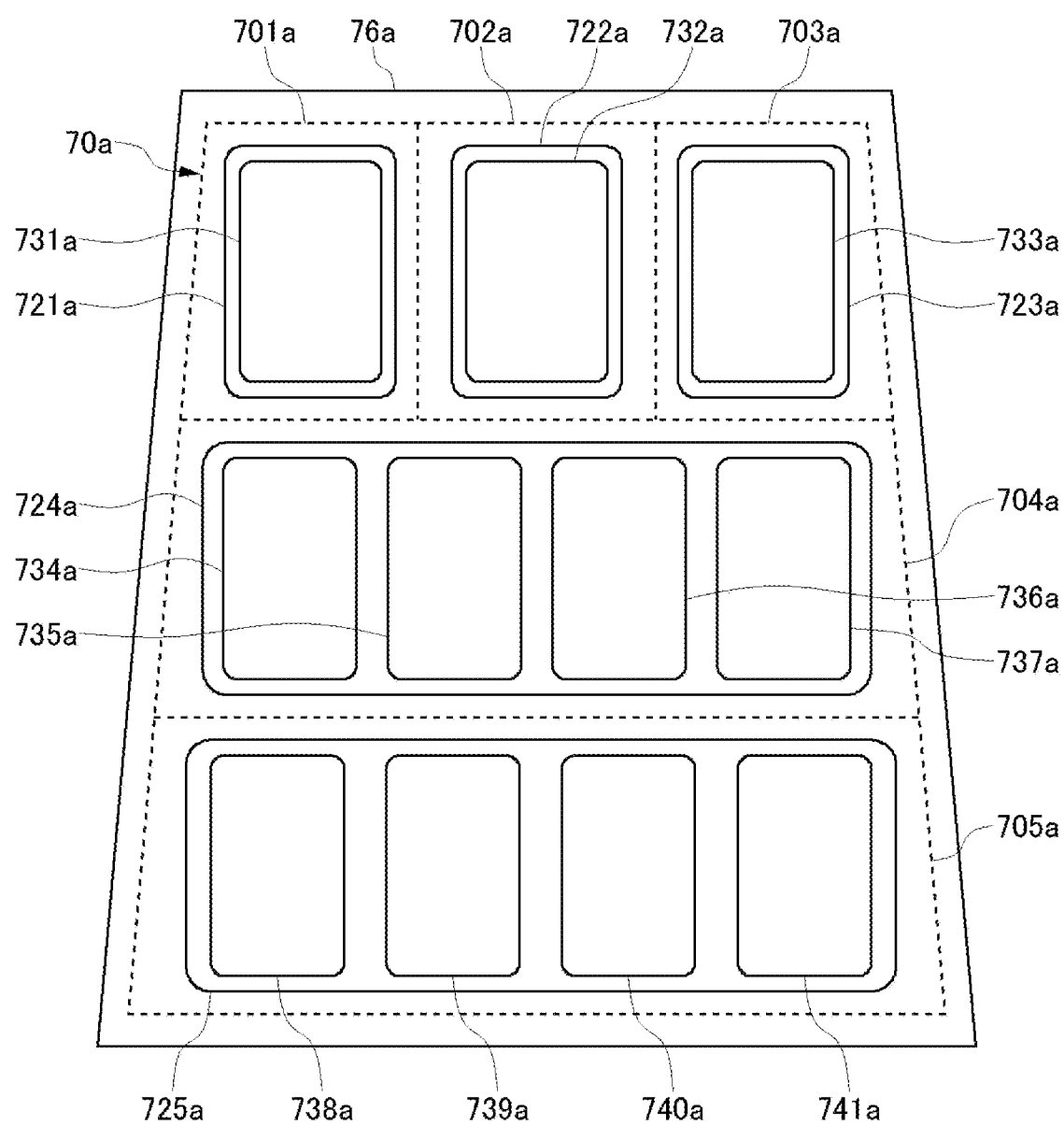
FIG. 24 illustrates the relationship between the board, antenna, and betting area of the eighth embodiment of the present invention.

FIG. 24 illustrates the relationship between the substrate, the antenna and the betting area in the eighth embodiment of the present disclosure. Though FIG. 24 illustrates the betting area 70a, the same is true for the betting areas 70b to 70e. In this embodiment, the reading antennas 721a to 725a corresponding to a player pair area 701a, a tie area 702a, a banker pair area 703a, a banker area 704a, and a player area 705a (each of which is also referred to as a "betting target") in the betting area 70a respectively are arranged on the substrate 76a. In other words, there are reading antennas that are controlled independently of each other for each betting target in the betting area 70a of each play position.

The substrate 76a is also provided with read-restriction antennas 731a to 741a corresponding to each betting target 701a to 705a respectively, which are independently controlled. Specifically, one read-restriction antennas 731a to 733a are provided for each of the betting targets 701a to 703a of the relatively small side bets, and four read-restriction antennas 734a to 737a and four read-restriction antennas 738a to 741a are respectively provided for the banker area 704a and the player area 705a as relatively large areas. In FIG. 24, the switches of the read-restriction antennas 731a-741a are omitted from the figure.

With this configuration, the game table reading system of the present embodiment can read the RFID tag 831 of the game token 83 placed on each betting targets 701 to 705 assigned to the betting areas 70a to 70e of each play position. Specifically, when the RFID tag 831 of the game token 83 is read for a betting target in one betting area, the switch of the read-restricted antenna of the other betting targets in the same betting area is closed and the jamming function is turned on. This reduces the possibility that the reading antenna of one betting target in question may read the RFID tag of the game token 83 placed on other betting targets in the same betting area.

When the reading area to be read by the reading antenna is relatively large, as in the case of reading the entire betting area of each play position in the seventh embodiment, the antenna power must be strong, but when the reading area is divided into each betting target, as in the case of the present embodiment, in addition to being able to determine which betting target the player is betting on, the antenna power applied to each reading antenna can be relatively weak, and thus a possibility that the RFID tag 831 of the game token 831 placed in other betting targets at a relatively close distance, for example, in the neighboring betting area, is read by mistake will be low. In the present embodiment, a plurality of independent read-restriction antennas can be provided for the relatively large banker area 704 and the player area 705 to provide a sufficient jamming effect. For a relatively small betting target as side bet, the antenna power of the reading antenna is also weak, and the limit of the number of game tokens 83 that can be stacked and read is also smaller than that for the relatively wide banker areas 704 and 705.

In this embodiment, when a plurality of reading areas are read at the same time, the control is such that a plurality of reading antennas in the same betting area are not read at the same time and that a plurality of betting targets in adjacent betting areas are not read at the same time. For example, if any of the reading antennas 721a to 725a in betting area 70a perform reading at the same time, the other reading antennas in betting area 70a and any of the reading antennas 721b to 725b in the adjacent betting area 70b also do not read at the same time The reading is performed at the reading antenna in betting area 70c, for example. In this case, if the reading is also performed with one of the relatively large reading antennas 724a or 725a among the reading antennas 721a to 725a in the betting area 70a, then in the reading area 70c, the reading is performed with one of the relatively small reading antennas 721c to 723c among the reading antennas 721c to 725c. This control reduces the possibility of interference caused by multiple reading antennas that are relatively large and have strong antenna power operating at the same time.

In the present embodiment, the RFID reader controlling the reading antennas 721 to 725 and the read-restriction antennas 731 to 741 may also be controlled in synchronization with the RFID reader controlling the reading antenna in the chip tray. For example, if the RFID tag 831 of the game token 83 housed in the chip tray is being read using the chip tray's reading antenna, no reading may be performed by the reading antenna in either betting area. The reading antenna of the chip tray may be controlled to repeatedly read the RFID tag 831 of the game tokens 83 housed in the chip tray when, for example, settlement including the collection of losing game tokens and redemption to winning game tokens is being performed after the game result has been determined. The reading antenna in the betting area may be repeatedly read while changing the reading position between when the settlement is completed and the player is available to bet for the next game and when the game result is determined. This reading allows the table reading system to identify the betting target on which the game tokens 83 were bet and the amount of the bet in each betting area 70a to 70e, and the table reading system can identify any unauthorized movement of the game tokens 83 (pinching, capping, (e.g., late betting, etc.) after the NMB (No More Betting), and it can be monitored whether the settlement was properly conducted by the dealer after the game results are finalized.

Figure 25:
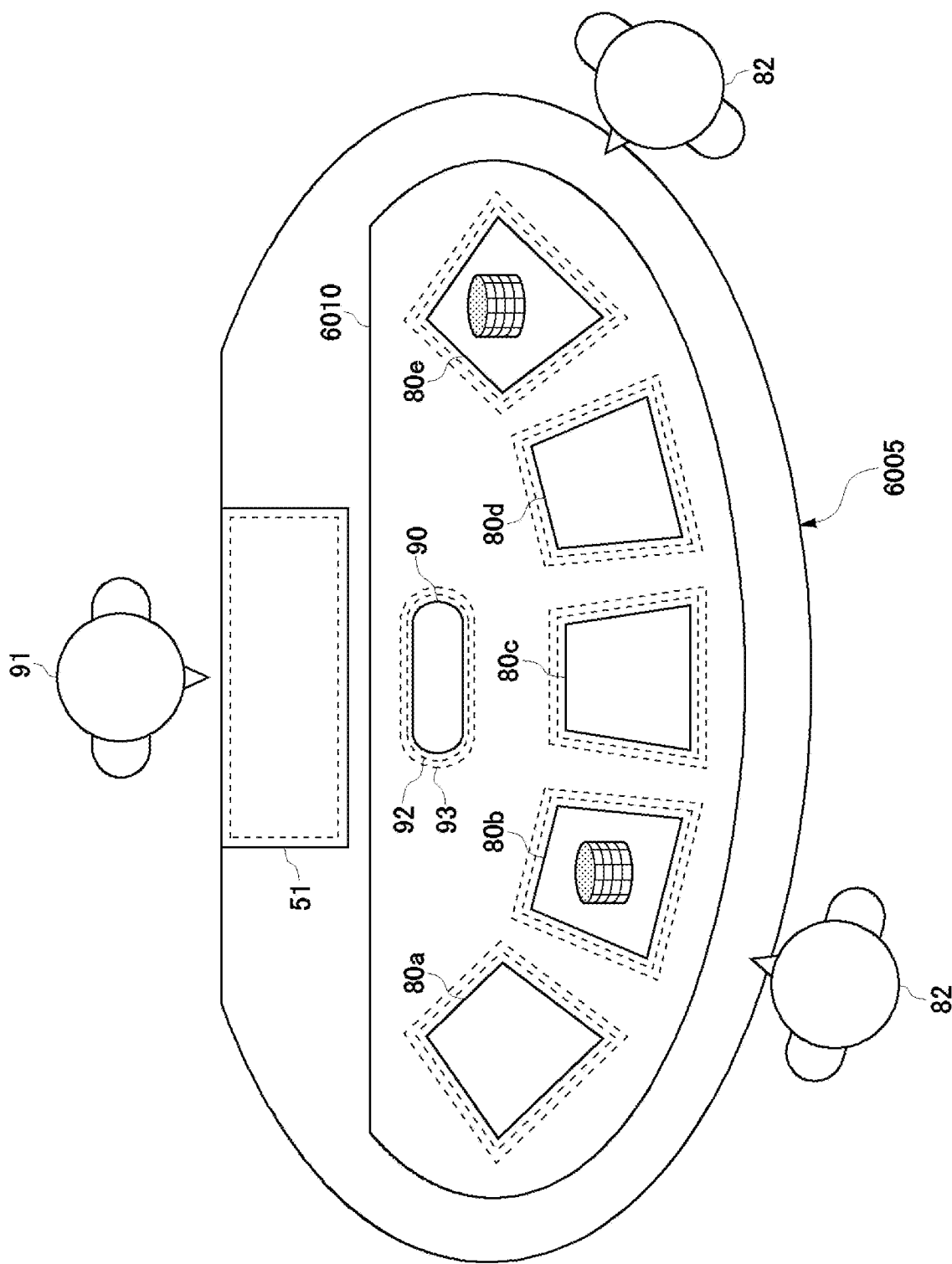
FIG. 25 illustrates a configuration of a table reading system of a ninth embodiment of the present invention.

FIG. 25 illustrates the configuration of the table reading system of the ninth embodiment of the present disclosure. The game table 6005 has a play position where the player 82 is located and a dealer position where the dealer 91 is located. On the play position side, a plurality of betting areas 80a to 80e are laid out on the table surface of the game table 6005. On the dealer position side, a chip tray 51 is provided. On the table surface of the gaming table 6005 between the chip tray 51 and the plurality of betting areas 80a to 80e, the dealer area 90 is laid out on the table surface of the game table 6005.

The chip tray 51 is provided with a reading antenna for reading the RFID tags 831 of the game tokens 83 housed in the chip tray 51. Each of the betting areas 80a to 80e is also provided with a reading antenna and a read-restriction antenna in accordance with any of the above examples. In this embodiment, a reading antenna 92 and a read-restriction antenna 93 are also provided in the dealer area 90.

The dealer area 90 is an area for positioning the game tokens 83 removed from the chip tray 51 once when the dealer 91 pay out the game tokens 83 from the chip tray 51 to the player 82 who has won the game. The RFID tag 831 of the game token 83 can be read by the reading antenna 92 in the dealer area 90 to identify the game token 83 to be paid out to the player 82 who won the game. The reading antenna 92 in the dealer area 90 does not read at the same time as the other betting areas in close proximity.

Specifically, the reading areas to be read may be switched in the procedure of reading in betting areas 80a to 80e in sequence and then reading only in dealer area 90, and in multiple reading areas, including multiple betting areas 80a to 80e and dealer area 90, readings may be performed in multiple reading areas at the same time so that they are not performed simultaneously in reading areas that are close to each other. Alternatively, for the dealer area 90, the reading may be performed at the timing of the game progress. That is, during betting and during gameplay, the plurality of betting areas 80a to 80e may be read in sequence, and during settlement, the plurality of betting areas 80a to 80e and the dealer area 90 may be read in sequence.

The game table 6005 of the present embodiment further comprises a metal wire 6010 that also serves as a decoration of the game table to enclose all of the plurality of betting areas 80a to 80e and the dealer area 90. This metal wire 6010 constitutes a closed loop that encloses all of the plurality of betting areas 80a to 80e and dealer areas 90. The chip tray 51 will be located outside of this closed loop.

With this configuration, the metal wire 6010 functions as a read-restriction antenna to restrict the reading of the RFID tag 831 of the game tokens 83 in the betting areas 80a to 80e and the dealer area 90 by the reading antenna of the chip tray 51. Thus, in this embodiment, the reading by the reading antenna of the chip tray 51 can be performed at any timing that is asynchronous with the betting areas 80a to 80e and the dealer area 90 described above. The metal wire 6010 functions as a read-restriction antenna, which prevents those reading antennas from reading the RFID tags 831 of the game tokens 83 in the chip tray 51 when the reading antennas are reading betting areas 80*a* to 80*e* and dealer area 90.

The thick woolen carpets may be stretched inside the metal wire 6010 and cushion may be provided to the outside of the metal wire 6010. This allows the metal wire 6010 to be installed on the game table 6005 without any discomfort as a decoration provided on the boundary between the cushion and the thick woolen carpets. In addition to or instead of the metal wire 6010, which functions as a read-restriction antenna, a shield may be provided between the chip tray 51 and the betting areas 80*a* to 80*e* and the dealer area 90 to prevent reading interference with each other.

As described above, according to the game table reading system 100 of the present embodiment, since a plurality of reading antennas are arranged parallel to a plane which is the surface of the game table, for RFID tags placed on the plan, and the RFID tags are read at each position of the plane, it is possible to determine where in the plane the position of the game tokens are located. In the game table, the position of the game tokens determines the betting targets bet by the user, and each area defining the betting targets is arranged close to each other. Furthermore, in the game table, even if the game table attempts to shield between each area, such a shield member cannot be provided on the surface of the game table. Therefore, as in the present embodiment, by properly arranging the read-restriction antenna to prevent the reading antenna from reading areas where should not be read, and by properly controlling the timing of the reading by the reading antennas and the timing of the read-restriction by the read-restriction antennas, it is possible to properly read and distinguish those multiple reading areas even when there are multiple reading areas are crowded together.

FIGURE REFERENCES

1, 13, 16, 18, 20, 100, Game table reading system
2, Game table
3, Player
4, 4*a*-4*e*, Betting area
5, Game token
6, Chip tray
7, 71*a*-75*e*, Reading antennas
8, Reading antenna
9, Read-restriction control device
10, 101*a*-105*e* Read-restriction antennas
11, Read-restriction antenna
12, Read-restriction control device
14, Member's card
15, Card reading area
17, Reading intensity setting unit
19, Game status determination system
21, 21*a*-21*e*, Pay areas
22, 22*a*-22*e*, Reading antennas
23, 23*a*-23*e*, Read-restriction antennas
41, Betting area
42, Pay area
51, Chip tray
52, Camera
53, Card reader
56, Management control device
57, Database
58, Card distribution device
60, Betting Area
61, Reading antenna
62, External read-restriction antenna
63-65, read-restriction antennas
66, Substrate
70, Betting area
721-725, Reading antennas
731-741, Read-restriction antennas
76, Substrate
81, Member's Card
82, Prayer
83, Game token
90, Dealer area
91, Dealer
92, Reading antenna
93, Read-restriction antenna
511, 521, 531, Reading antenna
512, 522, 532, read-restriction antennas
561, Reading control device
562, Read-restriction control device
831, RFID tag
6004, 6005, Game tables
6010, Metal wires

The invention claimed is:

1. A game table reading system for game tokens in which a radio frequency identification (RFID) tag is embedded, the game table reading system comprising:
   a game table having:
      a plurality of betting areas for wagering a game token; and
      a chip tray area associated with a dealer and configured to store at least one game token;
   a plurality of betting area reading antennas, each betting area reading antenna of the plurality of betting area reading antennas respectively installed in correspondence with a respective one of the plurality of betting areas and configured read an RFID tag embedded in a game token placed in the respective betting area;
   a plurality of betting area read-restriction antennas, each betting area read-restriction antenna of the plurality of betting area read-restriction antennas respectively installed in correspondence with a respective one of the plurality of betting areas;
   at least one chip tray reading antenna configured to read an RFID tag of the at least one game token stored in the chip tray area;
   a first control device configured to control the plurality of betting area reading antennas to perform one or more read operations;
   a second control device configured to control the plurality of betting area read-restriction antennas in synchronization with control of the plurality of betting area reading antennas by the first control device, wherein, to control the plurality of betting area read-restriction antennas in synchronization with control of the plurality of betting area reading antennas by the first control device, the second control device is configured to:
      for each of one or more of the betting areas of the plurality of betting areas that is adjacent to a first betting area the plurality of betting areas having the respective betting area reading antenna of the first betting area that is being controlled to perform a read operation associated with the first betting area:
         restrict a read operation by the respective betting area reading antenna of the betting area of the one or more betting areas; and
   a third control device configured to control the at least one chip tray reading antenna to perform a chip tray read operation at a time that is asynchronous with control of the plurality of betting area reading antennas by the first control device.

2. The game table reading system according to claim 1, wherein the first control device is configured to control the plurality of betting area reading antennas so that those of the plurality of betting area reading antennas that correspond to those of the betting areas that are adjacent to each other do not read simultaneously.

3. The game table reading system according to claim 1, wherein, to perform read-restriction, the second control device is configured to control those of the plurality of betting area read-restriction antennas within a predetermined distance from a betting area reading antenna of the betting area reading antennas performing a read operation.

4. The game table reading system according to claim 1, wherein the first control device is configured to respond to a lapse of a predetermined amount of time since no new information is read from one of the plurality of betting area reading antennas by starting a read operation by another one of the betting area reading antennas of the plurality of betting area reading antennas.

5. The game table reading system according to claim 1, wherein:
the first control device is configured to set an intensity of electromagnetic waves for read operations performed by the plurality of betting area reading antennas; and
the second control device is configured to select which of the plurality of betting area read-restriction antennas is to perform read-restriction according to the intensity set by the first control device.

6. The game table reading system according to claim 1, wherein the second control device is configured to select which of the plurality of betting area read-restriction antennas is to perform read-restriction depending on a size of an area to be read according to a control operation performed by the first control device.

7. The game table reading system according to claim 1, wherein:
the first control device is configured to cause multiple ones of the plurality of the betting area reading antennas to read simultaneously; and
the second control device is configured to cause those of the plurality of betting area read-restriction antennas that are between the multiple ones of the plurality of betting area reading antennas that are caused to simultaneously read to perform read-restriction.

8. The game table reading system according to claim 7, wherein, after all of the multiple ones of the plurality of betting area reading antennas have completed reading, the first control device is configured to cause another set of multiple ones of the plurality of the betting area reading antennas to read simultaneously.

9. The game table reading system according to claim 1, wherein the first control device is configured to select which one or more of the plurality of betting area reading antennas is to perform a read operation based on a determined progress of a game.

10. The game table reading system according to claim 1, wherein the game table is a table for baccarat, and the plurality of betting areas include a plurality of side betting areas provided for each play position and are located adjacent to each other.

11. The game table reading system according to claim 1, wherein the game table has a plurality of play positions, and the plurality of betting areas are provided for each of the plurality of play positions.

12. The game table reading system according to claim 11, wherein the plurality of betting areas include a player area and a banker area adjacent to each other for each of the plurality of play positions.

13. The game table reading system according to claim 12, wherein, for each betting area of the plurality of betting areas, the respective betting area reading antenna is provided for the player area and the banker area respectively.

14. The game table reading system according to claim 1, wherein the game table further has a card placing area in which can be placed a member card, the member card including an RFID tag embedded therein.

15. The game table reading system according to claim 1, wherein:
the game table further has a pay area for reading a set of game tokens to be paid out from the dealer to a winning player; and
the second control device is configured to causes one or more read-restriction antennas corresponding to those of the plurality of betting areas that are around the pay area to restrict reading when a reading antenna corresponding to the pay area performing a read operation.

16. The game table reading system according to claim 1, wherein:
the game table has a plurality of play positions;
for each play position of the plurality of play positions, the plurality of betting areas include a respective player area and a respective banker area that are adjacent to each other; and
the second control device is configured to control the plurality of betting area read-restriction antennas so that:
when the betting area reading antenna corresponding to one of the player areas, which is of one of the play positions, performs a read operation, the betting area read-restriction antenna corresponding to the banker area of the respective play position performs read-restriction; and
when the betting area reading antenna corresponding to the banker area of the respective play position performs a read operation, the betting area read-restriction antenna corresponding to the player area of the respective play position performs read-restriction.

17. The game table reading system of claim 1, wherein a pair of the betting areas that are immediately adjacent to each other are separated by one or two lines, and a distance between the pair of betting areas from each other is smaller than a size of the game token.

18. The game table reading system according to claim 1, further comprising:
an image recognition device that includes a camera and a processor,
wherein:
the camera is configured to capture the game token placed in the plurality of betting areas and generate an image; and
the processor is configured to analyze the image generated by the camera to identify in which of the plurality of betting areas the game token is placed, a type of the game token, and a number of the game token.

19. The game table reading system according to claim 1, wherein each of the plurality of betting area read-restriction antennas is configured to restrict a read operation by the respective one of the plurality of betting area reading antennas of the one of the plurality of betting areas to which the betting area read-restriction antenna corresponds.

20. The game table reading system according to claim 1, wherein:
- the first control device is coupled to the plurality of betting area reading antennas;
- the second control device is coupled to the plurality of betting area read-restriction antennas; and
- the third control device is coupled to the at least one chip tray reading antenna.

\* \* \* \* \*